(12) United States Patent
Kake

(10) Patent No.: US 11,416,597 B2
(45) Date of Patent: Aug. 16, 2022

(54) AUTHENTICATION SYSTEM AND ELECTRONIC PEN

(71) Applicant: Wacom Co., Ltd., Saitama (JP)

(72) Inventor: Akiyuki Kake, Saitama (JP)

(73) Assignee: Wacom Co., Ltd., Saitama (JP)

( * ) Notice: Subject to any disclaimer, the term of this patent is extended or adjusted under 35 U.S.C. 154(b) by 232 days.

(21) Appl. No.: 16/906,973

(22) Filed: Jun. 19, 2020

(65) Prior Publication Data

US 2020/0334351 A1 Oct. 22, 2020

Related U.S. Application Data

(63) Continuation of application No. PCT/JP2018/037308, filed on Oct. 5, 2018.

(Continued)

(51) Int. Cl.
*G06F 21/34* (2013.01)
*G06F 3/03* (2006.01)
(Continued)

(52) U.S. Cl.
CPC .......... *G06F 21/34* (2013.01); *G06F 3/0317* (2013.01); *G06F 3/03545* (2013.01); *G06F 21/36* (2013.01)

(58) Field of Classification Search
CPC .... G06F 21/34; G06F 3/0317; G06F 3/03545; G06F 21/36; G06F 3/0442; G06F 3/0446
(Continued)

(56) References Cited

U.S. PATENT DOCUMENTS

| 2004/0010722 A1* | 1/2004 | Ha .......................... G06F 21/36 726/16 |
| 2004/0053654 A1* | 3/2004 | Kokumai ................ G06F 21/36 463/1 |

(Continued)

FOREIGN PATENT DOCUMENTS

| JP | 2004-156265 A | 6/2004 |
| JP | 2004-303155 A | 10/2004 |

(Continued)

OTHER PUBLICATIONS

International Search Report, dated Dec. 18, 2018, for International Application No. PCT/JP2018/037308, 4 pages.

*Primary Examiner* — Jacob Lipman
(74) *Attorney, Agent, or Firm* — Seed IP Law Group LLP

(57) ABSTRACT

An authentication system includes an electronic pen and an electronic apparatus. The electronic pen includes: a pickup unit in a first end portion configured to pick up color or image information of a part when the first end portion is pressed against the part; and a transmitter configured to transmit the picked-up color or image information to the electronic apparatus. The electronic apparatus includes: a receiver configured to receive the color or image information transmitted from the electronic pen; an authentication reference information storage device configured to store color or image authentication reference information; an authentication success or failure determining circuit configured to determine a success or a failure of authentication by comparing the color or image information with the color or image authentication reference information; and a control circuit configured to remove security protection of an authentication target when it is determined that the authentication succeeds.

15 Claims, 26 Drawing Sheets

Related U.S. Application Data

(60) Provisional application No. 62/611,386, filed on Dec. 28, 2017.

(51) Int. Cl.
*G06F 3/0354* (2013.01)
*G06F 21/36* (2013.01)

(58) Field of Classification Search
USPC .......................................................... 726/20
See application file for complete search history.

(56) References Cited

U.S. PATENT DOCUMENTS

| | | |
|---|---|---|
| 2016/0048221 A1 | 2/2016 | Boulanger |
| 2017/0277286 A1 | 9/2017 | Chiu et al. |

FOREIGN PATENT DOCUMENTS

| | | | |
|---|---|---|---|
| JP | 2010-250475 A | 11/2010 |
| JP | 2017-182118 A | 10/2017 |
| JP | 2017-529594 A | 10/2017 |

\* cited by examiner

FIG.7

| AUTHENTICATION TARGET | AUTHENTICATION REFERENCE INFORMATION |
|---|---|
| | COLOR INFORMATION |
| STARTING OF APP A | Ca |
| STARTING OF APP B | Cb |
| STARTING OF APP C | Cc |
| OPENING OF FILE D | Cd |
| OPENING OF FILE E | Ce |
| OPENING OF FOLDER F | Cf |
| ⋮ | ⋮ |

FIG.13

| AUTHENTICATION TARGET | COLOR INFORMATION | PEN ID |
|---|---|---|
| STARTING OF APP A | Ca | IDa |
| STARTING OF APP B | Cb | IDb |
| STARTING OF APP C | Cc | IDc |
| OPENING OF FILE D | Cd | IDd |
| OPENING OF FILE E | Ce | IDe |
| ⋮ | ⋮ | ⋮ |

FIG.26

| AUTHENTICATION TARGET | COLOR INFORMATION | PEN ID | SIGNATURE DATA |
|---|---|---|---|
| STARTING OF APP A | Ca | IDa | SIGNa |
| STARTING OF APP B | Cb | IDa | SIGNb |
| STARTING OF APP C | Cc | IDa | SIGNc |
| OPENING OF FILE D | Cd | IDb | SIGNd |
| OPENING OF FILE E | Ce | IDb | SIGNe |
| ⋮ | ⋮ | ⋮ | ⋮ |

AUTHENTICATION SYSTEM AND ELECTRONIC PEN

BACKGROUND

1. Technical Field

The present disclosure relates to an authentication system using an electronic pen, and also relates to the electronic pen used for the authentication system.

2. Description of the Related Art

Recently, portable apparatuses such as personal computers (hereinafter referred to as PCs), smart phones, and the like have been miniaturized and thinned, and operating input through a display screen of a portable apparatus is enabled with a position detecting sensor such as a touch panel or the like provided in a state of being superposed on the display screen. In addition, an electronic pen has come into use to perform the operating input through the display screen.

PCs and smart phones often have various application programs installed thereon and store various data files and data folders. Among the various application programs and the various data files and data folders, there may be one for which a user desires to ensure security (protection) to preclude access thereto from other people without permission.

Accordingly, in order to satisfy the need, the one for which security is desired to be ensured being set as an authentication target, a variety of authentication methods and authentication systems for ensuring security of the authentication target have conventionally been provided.

A typical authentication method used often is a method that sets and registers a password code using numbers, alphabetic characters, symbols, or the like in advance, and determines a success or failure of authentication by comparing a password code input at a time of the authentication with the set and registered password code.

However, a password code formed by a combination of numbers, alphabetic characters, or symbols is relatively easy for another person to decrypt when the password code has a small number of digits. Accordingly, security is improved by increasing the number of digits and mixing numbers, alphabetic characters, and symbols with each other. However, when the number of digits of the password code is increased, an operation of inputting the password code is troublesome, and the user may forget the password code.

An authentication system using biological information such as fingerprints, irises, veins, or the like as authentication information is known as one method for solving this problem (see Patent Document 1 (Japanese Patent Laid-Open No. 2004-156265), Patent Document 2 (Japanese Patent Laid-Open No. 2010-250475), and the like).

However, in the case where biological information such as fingerprints, irises, veins, or the like is used as authentication information, there are advantages of making the operation of the user easier and eliminating the need to remember the password code of many digits, but a special device for obtaining those pieces of biological information is needed. Therefore, the authentication system is increased in scale, a load of information processing becomes heavy, and cost is increased.

In addition, no other person than a person who sets and registers biological information as authentication information can remove the security. Thus, no other person than the person who sets and registers the biological information can use the PC or the portable apparatus, so that inconvenience may be incurred instead.

BRIEF SUMMARY

It is an object of the present disclosure to provide an authentication system that can solve the above problems.

In order to solve the above problems, there is provided an authentication system including an electronic pen and an electronic apparatus configured to receive a signal from the electronic pen and perform authentication. The electronic pen includes a pickup unit and a transmitter. The pickup unit is disposed on a first side of a tubular casing, the first side being opposite in an axial direction of the electronic pen from a second side of the tubular casing that includes a tip for performing position indication input by interacting with a position detecting sensor. The pickup unit picks up color information or image information of a part when a first portion of the electronic pen is pressed against the part. The transmitter transmits the color information or the image information picked up by the pickup unit to the electronic apparatus. The electronic apparatus includes a receiver, an authentication reference information storage device, an authentication success or failure determining circuit, and a control circuit. The receiver receives the color information or the image information transmitted from the electronic pen. The authentication reference information storage device stores color authentication reference information or image authentication reference information. The authentication success or failure determining circuit determines a success or a failure of authentication by comparing the color information or the image information received by the receiver with the color authentication reference information or the image authentication reference information stored in the authentication reference information storage device. The control circuit removes security protection of an authentication target associated with the color authentication reference information or the image authentication reference information when the authentication success or failure determining circuit determines that the authentication succeeds.

In the authentication system of the above-described configuration, when the first end portion of the electronic pen is pressed against the part, the pickup unit picks up the color information or image information of the pressed part. Then, the transmitter of the electronic pen transmits the color information or the image information picked up by the pickup unit to the electronic apparatus.

In the electronic apparatus, the receiver receives the color information or the image information transmitted from the electronic pen, and the authentication success or failure determining circuit determines a success or a failure of authentication by comparing the color information or the image information with the color authentication reference information or the image authentication reference information stored in the authentication reference information storage device. Then, when the authentication success or failure determining circuit determines that the authentication succeeds, the control circuit of the electronic apparatus removes the security protection of the authentication target associated with the color authentication reference information or the image authentication reference information.

As described above, according to the authentication system of the above-described configuration, the pickup unit is provided in the first end portion of the electronic pen, and the electronic apparatus performs authentication processing using the color information or the image information of the part, the color information or the image information being picked up by pressing the pickup unit against the part. Hence, security can be ensured by a simple system configuration. In addition, authentication information can be the color or image information of the part, and is thus very convenient.

BRIEF DESCRIPTION OF THE DRAWINGS

FIG. 7 is a diagram of assistance in explaining contents stored in an authentication reference information storage device of the authentication system according the first embodiment of to the present disclosure;

FIG. 13 is a diagram of assistance in explaining contents stored in an authentication reference information storage device of the authentication system according to the second embodiment of the present disclosure;

FIG. 26 is a diagram of assistance in explaining contents stored in an authentication reference information storage device of the authentication system according to the fourth embodiment of the present disclosure.

DETAILED DESCRIPTION OF THE PREFERRED EMBODIMENTS

Embodiments of an authentication system and an electronic pen according to the present disclosure will hereinafter be described with reference to the drawings.

First Embodiment

Figure 1:
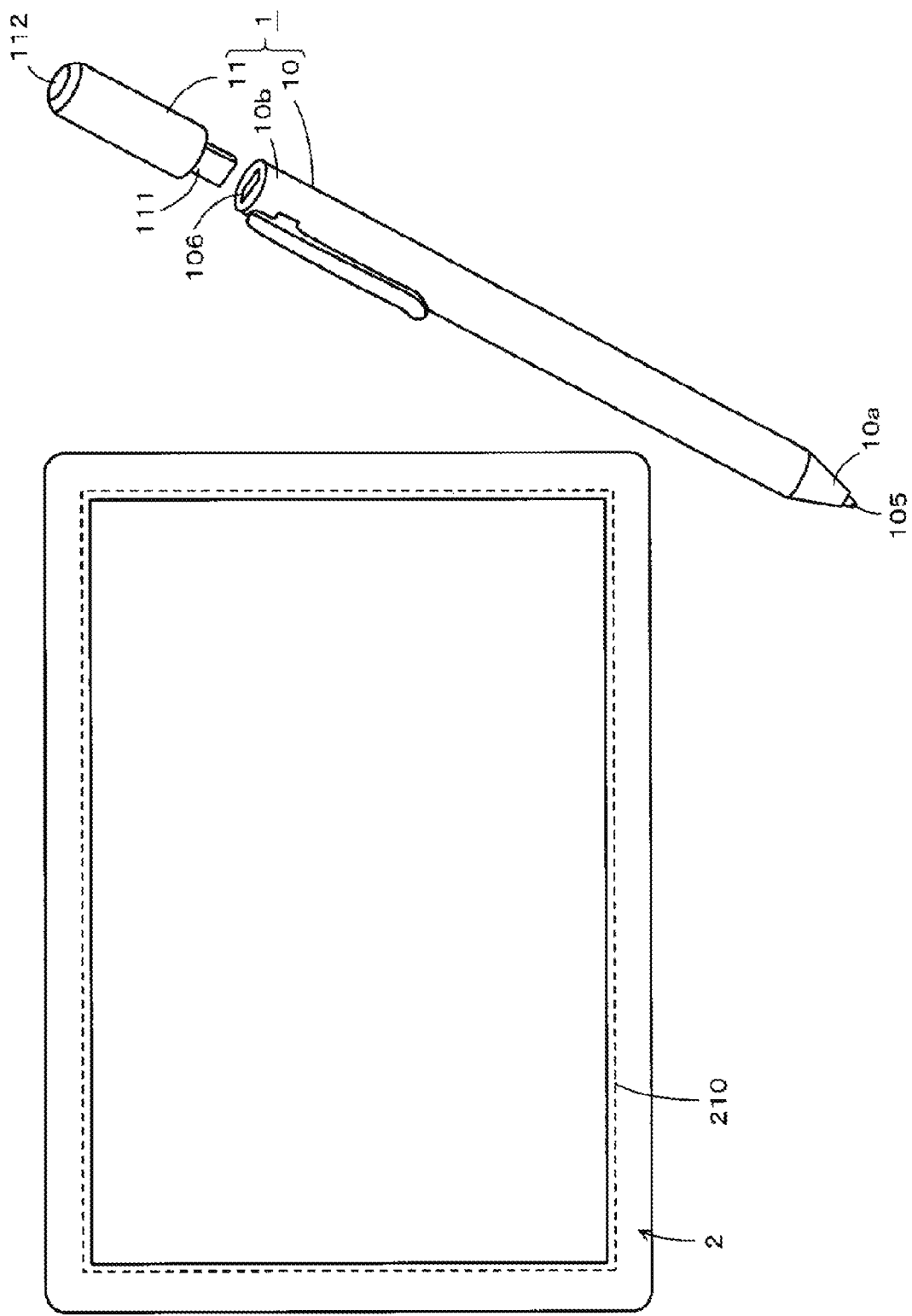
FIG. 1 is a diagram of assistance in explaining an outline of an example of a configuration of an authentication system according to an embodiment of the present disclosure.

FIG. 1 is a diagram illustrating an outline of an embodiment of an authentication system according to the present disclosure. The authentication system according to the present embodiment includes an electronic pen 1 and an electronic apparatus 2. The electronic pen 1 according to the present embodiment is formed by coupling an electronic pen main body unit 10 and a pickup unit 11 to each other.

The electronic pen main body unit 10 in the present example has a configuration of a so-called active capacitive type that has a power supply voltage generating unit and supplies a position detection signal to a sensor circuit of the electronic apparatus 2 by capacitive coupling. As will be described later, the power supply voltage generating device in the present example is formed by a battery that can be charged by an electromagnetic induction system or the like.

Incidentally, needless to say, the battery may be a primary battery. In addition, the electronic pen main body unit 10 is not limited to the configuration of the active capacitive type. The electronic pen main body unit 10 may have a configuration of a passive capacitance type, or may have a configuration of an electromagnetic induction type.

The pickup unit 11 is configured to be detachable from the electronic pen main body unit 10 as a unit (adapter) separate from the electronic pen main body unit 10. The pickup unit 11 in the present example is configured to be coupled by universal serial bus (USB) connection to a rear end portion 10*b* in an axial direction of the electronic pen main body unit 10 which rear end portion is on an opposite side from a pen tip portion 10*a* side of the electronic pen main body unit 10.

Specifically, in the present example, as illustrated in FIG. 1, a USB connector jack 106 is provided at the rear end portion 10*b* of the electronic pen main body unit 10, while a USB connector plug 111 is provided to the pickup unit 11. When the USB connector plug 111 of the pickup unit 11 is inserted into the USB connector jack 106 of the electronic pen main body unit 10, the electronic pen main body unit 10 and the pickup unit 11 are physically and electrically coupled to each other.

In the present embodiment, the pickup unit 11 does not include a battery. The pickup unit 11 is supplied with a power supply voltage from the battery of the electronic pen main body unit 10 through a USB connecting portion. The pickup unit 11 has a function of picking up color information as authentication information in the present example, and transmitting the color information to the electronic apparatus 2. Specifically, when a rear end portion of the pickup unit 11 is pressed against a part exhibiting an arbitrary color in a predetermined planar portion in a state in which the axial direction of the electronic pen main body unit 10 is perpendicular to the predetermined planar portion, the pickup unit 11 picks up the color of the part in the pressed planar portion, and transmits the picked-up color information to the electronic apparatus 2, as will be described later.

The electronic apparatus 2 in the present example is formed by a thin and small pad type personal computer, as illustrated in FIG. 1. The electronic apparatus 2 has various application programs and has functions of performing various information processing. In addition, the electronic apparatus 2 in the present example has a position detecting sensor interacting with the electronic pen 1, and the electronic pen 1 can be used as an operating input device. Further, the electronic apparatus 2 has a function of performing security protection of an authentication target such as an application program, a data file, or the like by using the color information sent from the pickup unit 11 of the electronic pen 1 as information for authentication.

<Example of Configuration of Electronic Pen Main Body Unit 10>

Figure 2:
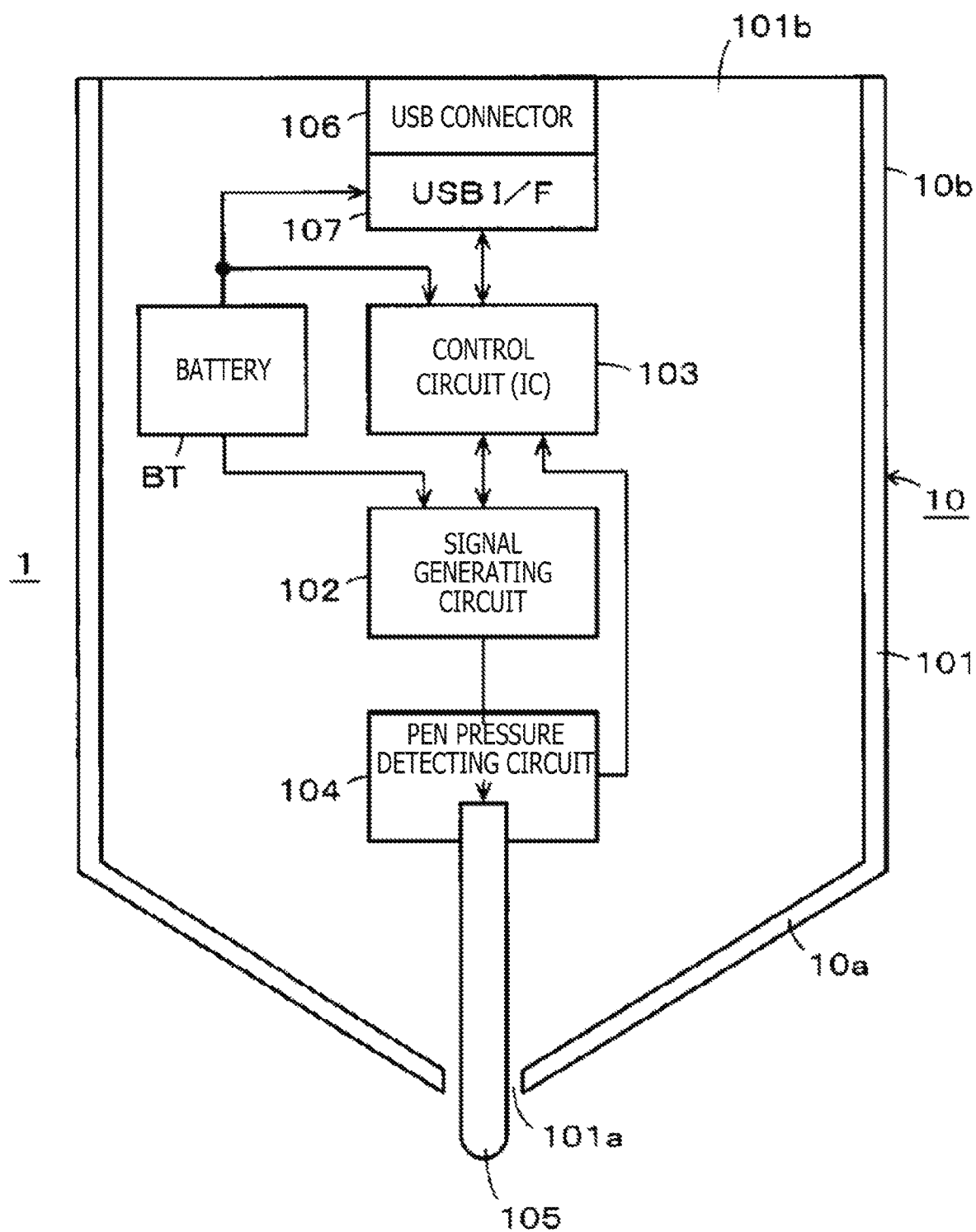
FIG. 2 is a block diagram illustrating an example of a configuration of an electronic pen main body unit of an electronic pen of the authentication system according to constituting a first embodiment of the present disclosure.

FIG. 2 is a diagram illustrating an example of a configuration of the electronic pen main body unit 10 according to the present embodiment. The electronic pen main body unit 10 includes, within a hollow portion of a tubular casing 101, a battery BT as an example of the power supply voltage generating device, a signal generating circuit 102, a control circuit 103 formed by an integrated circuit (IC), and a pen pressure detecting circuit 104. In addition, a core body 105 formed by a conductor is disposed within the casing 101 of the electronic pen main body unit 10 with a tip of the core body 105 disposed so as to protrude from an opening 101*a* on the pen tip portion 10*a* side in the axial direction of the casing 101, and with an opposite side of the core body 105 from the tip side of the core body 105 coupled to the pen pressure detecting circuit 104.

Further, in the present example, the USB connector jack 106 is provided in an opening portion 101*b* of the rear end portion 10*b* on a side that is opposite in the axial direction from a pen tip portion 10*a* of the casing 101. The USB connector jack 106 is connected to the control circuit 103 through a USB interface 107. In addition, a power supply voltage from the battery BT is supplied to the pickup unit 11 connected to the USB connector jack 106 through the USB interface 107 and the USB connector jack 106.

In the electronic pen main body unit 10 according to the present embodiment, the signal generating circuit 102 supplies a position detection signal to the core body 105 under control of the control circuit 103. When the core body 105 of the electronic pen main body unit 10 of the electronic pen 1 and the position detecting sensor of the electronic apparatus 2 are capacitively coupled to each other, the signal from the core body 105 of the electronic pen main body unit 10 is received in position detection of the electronic apparatus 2.

Specifically, when the core body 105 of the electronic pen 1 indicates a position on the position detecting sensor of the electronic apparatus 2, the position detection signal sent out from the core body 105 is received by the position detecting sensor of the electronic apparatus 2 through interaction using capacitive coupling between the core body 105 of the electronic pen main body unit 10 and the position detecting sensor of the electronic apparatus 2. Thus, as will be described later, the electronic apparatus 2 detects the position indicated by the core body 105 of the electronic pen main body unit 10 (position coordinates on the position detecting sensor).

The control circuit 103 in the present example also generates pen pressure information corresponding to a pen pressure value detected by the pen pressure detecting circuit 104, and supplies the pen pressure information to the signal generating circuit 102. The signal generating circuit 102 is configured to supply the pen pressure information to the core body 105 together with the position detection signal by, for example, a time division multiplexing system, a frequency division multiplexing system, or another signal multiplex system, and thereby supply the pen pressure information to the electronic apparatus 2. Incidentally, the signal generating circuit 102 may be configured to send out the position detection signal as a burst signal, and convert the pen pressure information into digital information, modulate the digital information into an on-off keying (OOK) signal or an amplitude shift keying (ASK) signal, and send out the signal.

<Example of Configuration of Pickup Unit 11>

Figure 3:
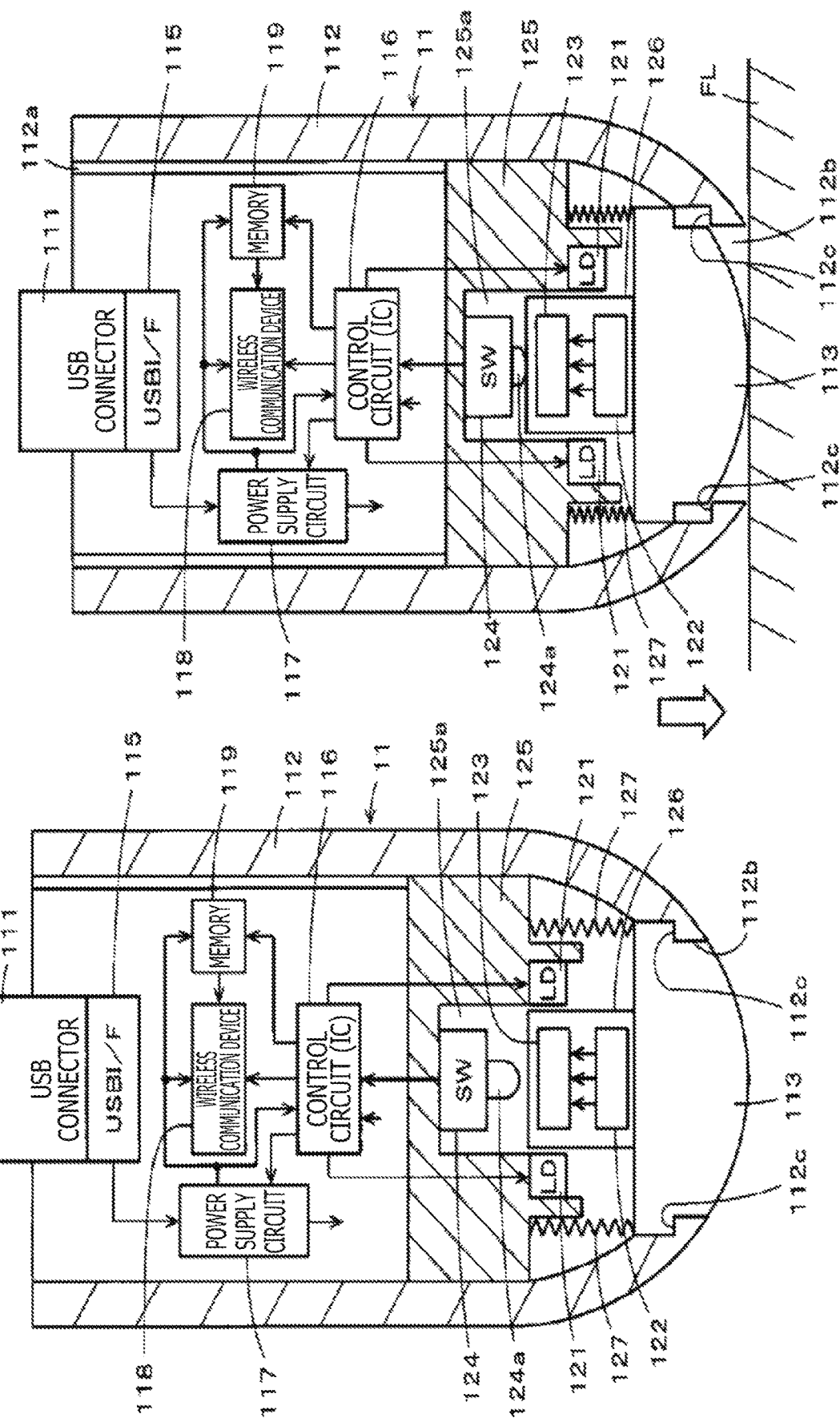
FIGS. 3A and 3B are diagrams illustrating an example of a configuration of a pickup unit of the authentication system according to the first embodiment of the present disclosure.

FIGS. 3A and 3B are diagrams illustrating an example of a configuration of the pickup unit 11 according to the present embodiment. FIGS. 3A and 3B illustrate the rear end portion side of the pickup unit 11 in a downward facing state. FIG. 3A illustrates a free state in which the rear end portion of the pickup unit 11 is closed. FIG. 3B illustrates a state in which the rear end portion of the pickup unit 11 is pressed against an arbitrary planar portion FL and an opening in the rear end portion of the pickup unit 11 is closed.

As illustrated in FIGS. 3A and 3B, the pickup unit 11 has the USB connector plug 111 in the present example on an opening portion 112*a* side of a tubular casing 112 which side is coupled to the electronic pen main body unit 10. A lens 113 is disposed in an opening portion 112*b* of a rear end portion within the hollow portion of the casing 112 of the pickup unit 11 which rear end portion is on a side opposite from the side coupled to the electronic pen main body unit 10 in the axial direction. A color detecting constituent unit including also the lens 113 as a constituent element is disposed on the inside of the lens 113. Further disposed within the hollow portion of the casing 112 of the pickup unit 11 are a USB interface 115, a control circuit 116, a power supply circuit 117, a wireless communication device 118, and a memory 119, which are arranged on a printed board 114.

The wireless communication device 118 in the present example is formed by a wireless communication circuit of a short-range radio communication system, for example a Bluetooth (registered trademark) standard. The wireless communication device 118 is not limited to such a wireless communication circuit using radio waves. For example, an optical communication circuit using infrared rays or the like can also be used as the wireless communication device 118.

The USB interface 115 supplies the power supply voltage from the battery BT of the electronic pen main body unit 10 to the power supply circuit 117 when the electronic pen main body unit 10 and the pickup unit 11 are connected to each other by USB. The power supply circuit 117 generates power supply voltages for respective parts of the pickup unit 11 and supplies the power supply voltages to the respective parts of the control circuit 116, the wireless communication device 118, and the memory 119, and supplies power supply voltages to light emitting elements 121, a light receiver 122, a color detecting circuit 123, and a pressing detection switch 124 constituting the color detecting constituent unit.

The control circuit 116 performs control of storing the color information picked up and generated by the color detecting constituent unit as will be described later in the memory 119 and transmitting the color information to the electronic apparatus 2 through the wireless communication device 118. The control circuit 116 also has a function of controlling the operation of color pickup by the color detecting constituent unit.

The color detecting constituent unit in the present example includes not only the lens 113 but also light emitting diodes (LEDs) as an example of the light emitting elements 121, the light receiver 122, the color detecting circuit 123, the pressing detection switch 124, and a holder portion 125.

As illustrated in FIGS. 3A and 3B, the light receiver 122 and the color detecting circuit 123 are unitized and housed within a case 126, and the case 126 is disposed on the rear side of the lens 113 in a state of being movable together with the lens 113. In this case, the case 126 is disposed on the rear side of the lens 113 such that the light receiver 122 can receive light condensed by the lens 113.

Figure 4:
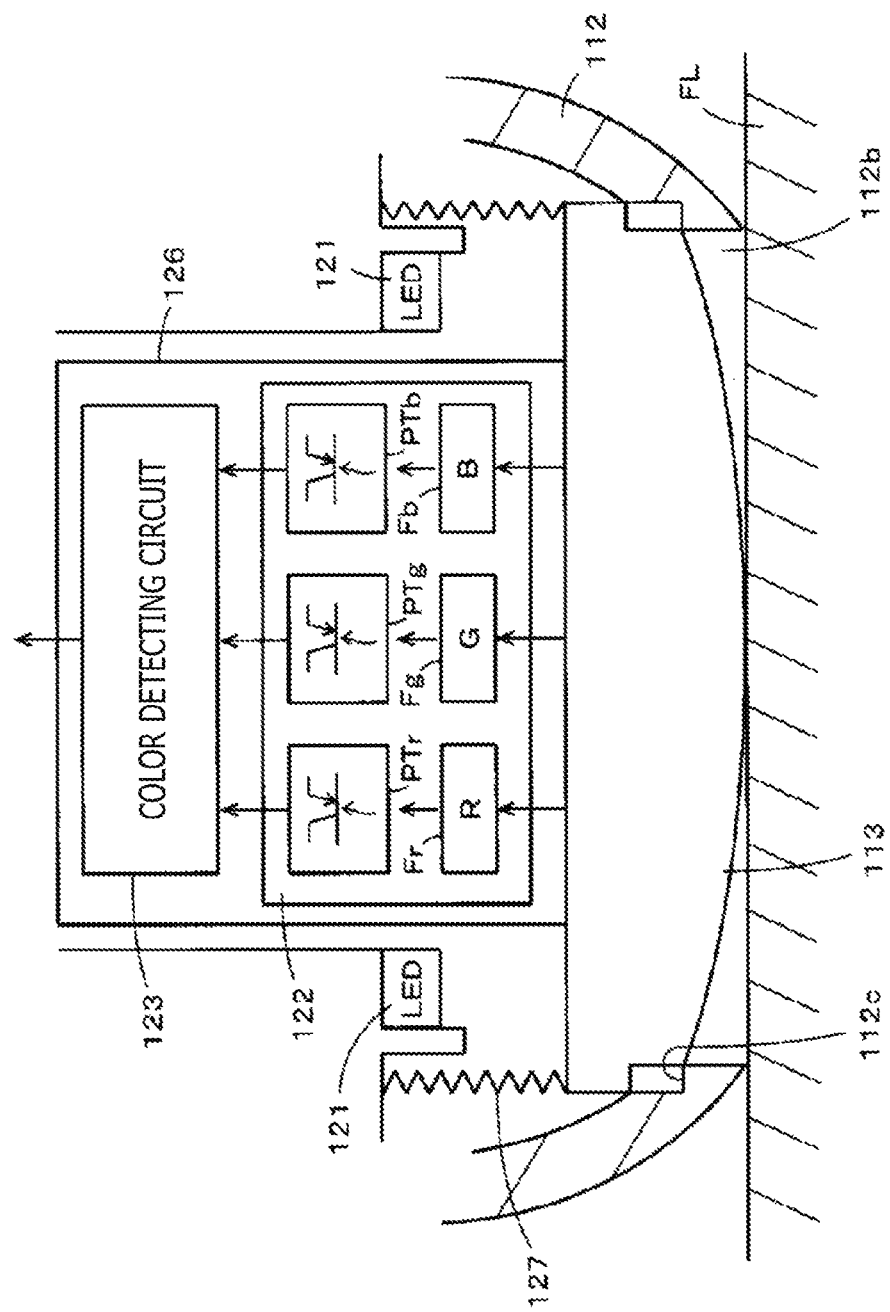
FIG. 4 is a diagram of assistance in explaining a part of the pickup unit in the examples of FIGS. 3A and 3B.

As illustrated in FIG. 4, the light receiver 122 in the present example is constituted of optical filters Fr, Fg, and Fb transmitting only red light, green light, and blue light, respectively, and phototransistors PTr, PTg, and PTb respectively receiving the red light, the green light, and the blue light transmitted by the respective optical filters Fr, Fg, and Fb. Light reception output signals of the phototransistors PTr, PTg, and PTb are supplied to the color detecting circuit 123.

The color detecting circuit 123 generates color information from the light reception output signals corresponding to the respective light reception levels of the red light, the green light, and the blue light from the respective phototransistors PTr, PTg, and PTb of the light receiver 122. For example, the color detecting circuit 123 converts the respective light reception output signals of the red light, the green light, and the blue light into a plurality of bits corresponding to the respective signal levels, for example digital signals Dr, Dg, and db each having 8 bits. In addition, lightness information (luminance information) indicating brightness is also generated as a digital signal Y of 8 bits, for example, from the light reception output signals, and is formed as color information together with the digital signals Dr, Dg, and db. In the present embodiment, the color detecting circuit 123 generates color information in an L*a*b* color system obtained by equation transformation from the digital signals Dr, Dg, and db and Y.

Incidentally, the color information generated by the color detecting circuit 123 is not limited to the color information in the L*a*b* color system. As the color information generated by the color detecting circuit 123, color information in an RGB color system using three primary colors of the red light, the green light, and the blue light may be used, or color information in an L*u*v*color system or another color system may be used.

As illustrated in FIGS. 3A and 3B, the holder portion 125 is disposed in a state of being immovable in the axial direction on the rear end portion side within the hollow portion of the casing 112 of the pickup unit 11. A recessed portion 125a opening to the lens 113 side is provided in a central portion of the holder portion 125. The pressing detection switch 124 is disposed in a bottom portion of the recessed portion 125a.

The pressing detection switch 124 has a pressing element 124a. The pressing detection switch 124 is configured to be in an off state when the pressing element 124a is not pressed, and to be in an on state when the pressing element 124a is pressed. In the present embodiment, the pressing detection switch 124 is disposed in the recessed portion 125a of the holder portion 125 in a state in which the pressing element 124a protrudes to the lens 113 side. The pressing detection switch 124 is connected to the control circuit 116. The control circuit 116 has a function of monitoring the switch state of the pressing detection switch 124.

The case 126 housing the light receiver 122 and the color detecting circuit 123 and attached to the rear side of the lens 113 is provided in a state of facing the pressing element 124a of the pressing detection switch 124. In this case, the case 126 is smaller than the inside diameter of the recessed portion 125a of the holder portion 125. The case 126 is therefore movable in a direction of pressing the pressing element 124a.

In the present example, a plurality of light emitting elements (LEDs) 121 is arranged on the periphery of an opening on the lens 113 side of the recessed portion 125a of the holder portion 125. The turning on and off of the plurality of light emitting elements 121 is controlled by a control signal from the control circuit 116.

In the present example, the plurality of light emitting elements 121 are for example arranged at equal intervals on the periphery of the opening on the lens 113 side of the recessed portion 125a of the holder portion 125. One light emitting element 121 suffices to pick up a color. However, with the configuration as in the present example, when the pickup unit 11 is pressed against the planar portion FL as illustrated in FIG. 3B, the light emitted by the light emitting elements 121 is applied to the planar portion FL through the lens 113, and the light reflected from the planar portion FL can uniformly enter the light receiving surface of the light receiver 122 through the lens 113.

In addition, in the present embodiment, an elastic member always biasing the lens 113 to the opening portion 112b side of the casing 112, or a coil spring 127 in the present example is disposed between an end surface on the lens 113 side of the holder portion 125 and a surface on the rear side of the lens 113, as illustrated in FIGS. 3A and 3B and FIG. 4.

Hence, as illustrated in FIG. 3A, in a normal state in which no pressing force is applied to the lens 113 side of the pickup unit 11, an elastic force of the coil spring 127 presses the lens 113 against a step portion 112c of the opening portion 112b of the casing 112, and the opening portion 112b of the casing 112 is thus closed by the lens 113.

When the lens 113 side of the pickup unit 11 is pressed against the planar portion FL as illustrated in FIG. 3B, the lens 113 is pushed into the casing 112 of the pickup unit 11 against the elastic force of the coil spring 127. Then, with the sliding movement of the lens 113 to the inside of the casing 112 of the pickup unit 11, the case 126 moves in the axial direction and depresses the pressing element 124a of the pressing detection switch 124. The pressing detection switch 124 thereby changes in state from an off state to an on state.

The control circuit 116 of the pickup unit 11 detects that the pressing detection switch 124 has changed to the on state, and thereby detects that the rear end portion of the pickup unit 11 is pressed against the planar portion FL. Then, the control circuit 116 controls all of the plurality of light emitting elements 121 from the off state to the on state based on the detection of the on state of the pressing detection switch 124.

In this case, when the rear end portion of the pickup unit 11 is pressed against the planar portion FL in a state in which the axial direction of the pickup unit 11 is perpendicular to the planar portion FL, a circumferential end portion of the opening portion 112b on the lens 113 side of the pickup unit 11 comes into close contact with the planar portion FL, so that the entry of external light into the opening portion 112b of the pickup unit 11 is blocked. Hence, only the light emitted by the plurality of light emitting elements 121 is applied from the opening portion 112b of the rear end portion of the pickup unit 11 to the planar portion FL through the lens 113. That is, the light emitted by the plurality of light emitting elements 121 is applied to a part of the planar portion FL which part corresponds to the opening portion 112b of the rear end portion of the pickup unit 11. Thus, from the part of the planar portion FL, reflected light corresponding to the color of the part enters the light receiver 122 through the lens 113.

Incidentally, in a case where the casing 112 of the pickup unit 11 is formed by an elastic body such as a resin, a rubber, or the like capable of elastic deformation, the degree of the close contact between the circumferential end portion of the opening portion 112b on the lens 113 side of the pickup unit 11 and the planar portion FL can be increased when the rear end portion of the pickup unit 11 is pressed against the planar portion FL. Alternatively, an elastic body ring fitted to an outer circumferential portion of the lens 113 and protruding from the lens 113 in a direction along the axial direction of the casing 112 may be provided to the opening portion 112b.

As described earlier, in the present example, the light receiver 122 receives light incident on the light receiver 122 as a red light component, a green light component, and a blue light component separately, and outputs light reception outputs corresponding to the light reception levels of the respective components to the color detecting circuit 123. The color detecting circuit 123 generates color information in the L*a*b* color system from the light reception outputs from the light receiver 122, as described earlier. The color information generated by the color detecting circuit 123 is stored in the memory 119 under control of the control circuit 116. The control circuit 116 then transmits the color information stored in the memory 119 to the electronic apparatus 2 through the wireless communication device 118. When the control circuit 116 confirms completion of the transmission of the color information (completion of reception at the electronic apparatus 2) by communication with the electronic apparatus 2 through the wireless communication device 118, the control circuit 116 stops the transmission, and erases the color information stored in the memory 119.

Incidentally, when the rear end portion of the pickup unit 11 is pressed against the planar portion FL and the color of the pressed part is picked up, blocking the entry of the external light into the opening portion 112b of the pickup unit 11 as much as possible is preferable from a viewpoint of picking up an accurate color. However, when the rear end portion of the pickup unit 11 is pressed against the planar portion FL, the axial direction of the pickup unit 11 may be slightly shifted from the state of being perpendicular to the planar portion FL, and the external light may slightly enter through the opening portion 112a of the pickup unit 11. As will be described later, when authentication using the color information is performed, whether or not the authentication succeeds is determined based on match detection by comparing registered color information (authentication reference information) with the picked-up color information (information to be authenticated). By changing a threshold value for determining the match, it is possible to determine that the two pieces of color information match each other even when the two pieces of color information slightly differ from each other.

<Example of Configuration of Electronic Apparatus 2>

Figure 5:
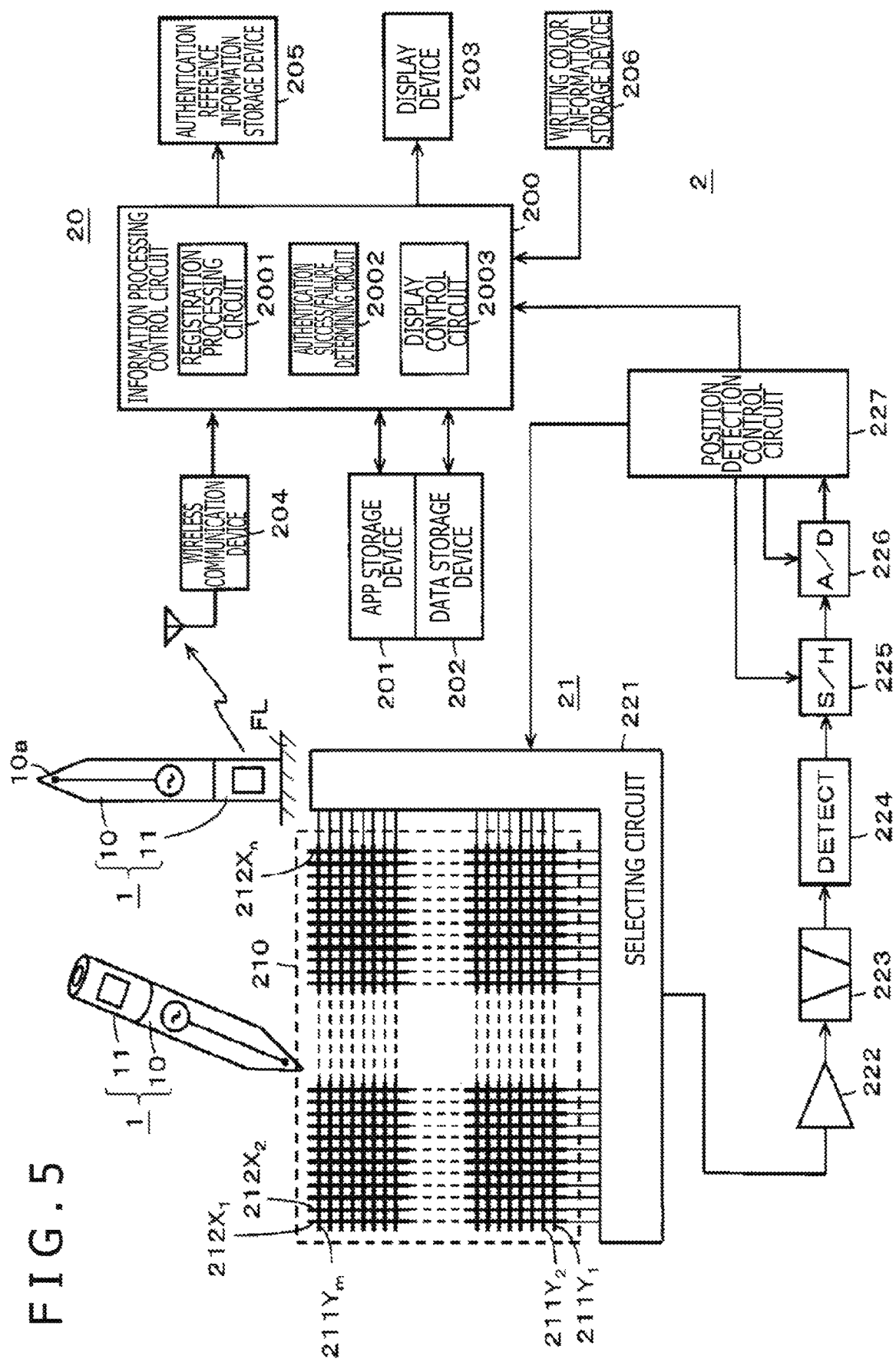
FIG. 5 is a diagram illustrating an example of a configuration of an electronic apparatus of the authentication system according to the first embodiment of the present disclosure.

As illustrated in FIG. 5, the electronic apparatus 2 in the present example includes: a position detection processing circuit 21 including a position detecting sensor 210 for detecting a position indication input indicated by the pen tip portion 10a of the electronic pen main body unit 10 by interacting with the electronic pen main body unit 10 by capacitive coupling; and an information processing circuit 20 that performs various information processing.

The position detection processing circuit 21 of the electronic apparatus 2 receives the position detection signal from the electronic pen main body unit 10 through the position detecting sensor 210, and detects a position on the position detecting sensor 210 which position is indicated by the pen tip portion 10a of the electronic pen main body unit 10.

The position detecting sensor 210 is formed by stacking a first conductor group and a second conductor group with an insulating layer interposed therebetween. In the first conductor group, a plurality of first conductors $211Y_1$, $211Y_2$, . . . , $211Y_m$ (m is an integer of one or more) extending in a horizontal direction (X-axis direction) are arranged in a Y-axis direction in parallel so as to be separated from each other at predetermined intervals. In addition, in the second conductor group, a plurality of second conductors $212X_1$, $212X_2$, . . . , $212X_n$ (n is an integer of one or more) extending in a direction intersecting the extending direction of the first conductors $211Y_1$, $211Y_2$, . . . , $211Y_m$, or a vertical direction (Y-axis direction) orthogonal to the extending direction of the first conductors $211Y_1$, $211Y_2$, . . . , $211Y_m$ in the present example, are arranged in the X-axis direction in parallel so as to be separated from each other at predetermined intervals.

A selecting circuit 221 as an input-output interface is provided between the position detecting sensor 210 and a position detection control circuit 227 of the position detection processing unit 21. The selecting circuit 221 in the present example is controlled so as to select one conductor from each of the first conductor group and the second conductor group based on a control signal from the position detection circuit 227.

A transmission signal from the electronic pen 1 is input to the position detection processing circuit 21 from the conductor of the position detecting sensor 210 which conductor is selected by the selecting circuit 221 according to the control signal from the position detection control circuit 227. In the position detection processing unit 21, the transmission signal formed by a modulated signal of a sinusoidal signal from the electronic pen 1 is amplified by an amplifier circuit 222, and then supplied to a band-pass filter 223, where only a frequency component of the sinusoidal signal is extracted.

The output signal of the band-pass filter 223 is detected by a detecting circuit 224. The detection output signal of the detecting circuit 224 is sampled and held in predetermined timing by a sample and hold circuit 225 according to a sampling signal from the position detection control circuit 227, and is thereafter converted into a digital value by an AD converting circuit 226. The digital data from the AD converting circuit 226 is supplied to the position detection control circuit 227. The position detection control circuit 227 calculates position coordinates on the position detecting sensor 210 which position coordinates are indicated by the electronic pen 1 from the digital data.

In addition, pen pressure information detected by the pen pressure detecting circuit 104 is transmitted from the electronic pen 1 to the position detecting sensor 210 together with the position detection signal in a time division state. The position detection control circuit 227 of the position detection processing circuit 21 detects a pen pressure value from the pen pressure information. The position detection control circuit 227 then supplies an information processing control circuit 200 of the information processing circuit 20 with the position coordinates on the position detecting sensor 210 which position coordinates are indicated by the detected electronic pen 1 and information on the pen pressure value.

The information processing circuit 20 in the present example is formed by connecting the information processing control circuit 200 with: an app storage device 201 that stores one to a plurality of application programs; a data storage device 202 that stores a file or a folder of a document constituted of characters, symbols, numbers, or the like input on the position detecting sensor 210 by the electronic pen 1 and a file or a folder of drawing information such as a figure, a picture, or the like drawn on the position detecting sensor 210 by the electronic pen 1; a display device 203; a wireless communication device 204; an authentication reference information storage device 205; and a writing color information storage device 206.

The display device 203 in the present example is formed by a liquid crystal display (LCD). The wireless communication device 204 is formed by a wireless communication device that can communicate with the wireless communication device 118 of the pickup unit 11 of the electronic pen 1. In the present example, the wireless communication device 204 is formed by a wireless communication device of the Bluetooth (registered trademark) standard.

As will be described later, the authentication reference information storage device 205 stores authentication reference information in which color information is associated with authentication targets in advance, and is provided with a buffer area storing color information sent from the electronic pen 1 to compare the color information with the authentication reference information by reference when an authentication request is made. Here, the authentication reference information refers to information registered in advance and referred to, to be compared with information to be authenticated in order to determine whether or not the information matches when authentication processing is performed.

When writing input on the position detecting sensor 210 of the electronic apparatus 2 is performed by the electronic pen 1, the writing color information storage device 206 stores information on the writing color of the writing input. In the present embodiment, as will be described later, the color information sent from the electronic pen 1 is stored as the writing color information.

The information processing control circuit 200 in the present example is formed by a microprocessor including an IC. The information processing control circuit 200 in the present embodiment includes functional circuits of a registration processing circuit 2001 for the authentication reference information, an authentication success or failure determining circuit 2002, and a display control circuit 2003 and other functional circuits, and is configured to implement each functional circuit by executing an application program stored in the app storage device 201.

The registration processing circuit 2001 performs processing of specifying an application program allowed to be used only when authentication is achieved and thus requiring authentication processing in the app storage device 201, registering authentication reference information for the authentication processing, and storing the authentication reference information in the authentication reference information storage device 205. In the present example, the above-described color information is used as the authentication reference information.

The authentication success or failure determining circuit 2002 performs processing of determining a success or failure of authentication by comparing the registered authentication reference information with the color information sent from the electronic pen 1. When a degree of matching between the color information of the registered authentication reference information and the color information of the information to be authenticated which information is sent from the electronic pen 1 is equal to or more than a predetermined threshold value, the authentication success or failure determining circuit 2002 determines that the authentication is achieved (authentication OK). When the degree of matching is less than the predetermined threshold value, the authentication success or failure determining circuit 2002 determines that the authentication is not performed successfully (authentication FAILURE).

In this case, the determination of the degree of matching between the color information of the registered authentication reference information and the color information of the information to be authenticated which information is sent from the electronic pen 1 calculates a difference between the two pieces of color information, and determines that the authentication is OK when the difference is equal to or less than the threshold value, and determines that the authentication is FAILURE when the difference exceeds the threshold value. The threshold value is determined in consideration of cases where colors may slightly change depending on an external environment such as time, a place, an atmospheric temperature, or the like when the colors are detected and usage conditions of the pickup unit 11.

In addition, in picking up each piece of color information, the color is not necessarily extracted from a same object at all times. For example, in a case where a user recognizes a white part of a planar portion of a certain object in a certain place as "white," picks up the color by the pickup unit 11, and registers the color as the authentication reference information, and the pickup unit 11 picks up "white" as the information to be authenticated from a white part of a planar portion in another place or of another object, the two colors are not necessarily precisely the same "white." Therefore, the threshold value is set such that it can be determined that a predetermined similarity range, rather than a physical match, constitutes a match.

The setting of the threshold value can also be used for strengthening or weakening security. Specifically, in order to make security strict (strong), the threshold value for the difference between the color information of the registered authentication reference information and the color information of the information to be authenticated is selected to be a value between zero to a minute value. When security is to be made relatively weak, the threshold value for the difference is selected to be a somewhat large value. That is, in the case of the narrow range of the degree of color matching, only a nearly perfectly matching color is permitted, and thus a secure system with strong security can be provided. On the other hand, in the case of the wide range of the degree of color matching, a weak security system can be provided.

Based on an authentication determination result of the authentication success or failure determining circuit 2002, the information processing control circuit 200 performs a control operation for an authentication target associated with the authentication reference information, that is, performs control as to whether or not to start an application program or performs control as to whether or not to open a file or a folder and permit the use of data.

The display control circuit 2003 performs a display function of each application program, and performs control to display a display image on a display screen 203D (see FIG. 1) of the display device 203.

In the present embodiment, as for writing input on the position detecting sensor 210 of the electronic apparatus 2 by the electronic pen 1, a trace of writing of the pen point of the electronic pen 1 is displayed in color using the color information stored in the writing color information storage device 206. As will be described later, in the present embodiment, a user can request the electronic apparatus 2 to register a writing color, perform a color pickup operation using the pickup unit 11 of the electronic pen 1, and transmit color information to the electronic apparatus 2. In response to the request to register the writing color, the electronic apparatus 2 stores the color information received from the pickup unit 11 of the electronic pen 1 in the writing color information storage device 206, and uses the color information as a display color for subsequent writing input on the position detecting sensor 210 by the electronic pen 1.

[Processing Operation Related to Authentication by Electronic Pen 1 and Electronic Apparatus 2 and Writing Color]

Description will next be made of an example of a flow of processing operation related to authentication by the electronic pen 1 and the electronic apparatus 2 and a flow of processing operation related to the display color (writing color) of writing input on the position detecting sensor 210 by the electronic pen 1.

<Description of Color Information Pickup Operation by Pickup Unit 11 of Electronic Pen 1>

First, referring to a flowchart of FIG. 6, description will be made of an example of a flow of color information obtaining operation in the pickup unit 11 of the electronic pen 1. Incidentally, description will be made supposing that the operation of each act in FIG. 6 is performed by the control circuit 116 of the pickup unit 11.

In picking up the color information, as illustrated in an upper central part of FIG. 5, the user presses the rear end side of the pickup unit 11 against a part of the planar portion FL which part exhibits a color that the user desires to pick up, the color being white, red, green, blue, or the like, with the pen tip portion 10a side of the electronic pen 1 oriented upward. At this time, the user presses the rear end side of the pickup unit 11 against the planar portion FL such that the axial direction of the casing 101 of the electronic pen 1 is perpendicular to the planar portion FL.

Then, as illustrated in FIG. 3B, in the pickup unit 11 of the electronic pen 1, the lens 113 in the rear end portion of the pickup unit 11 is pushed into the inside against the elastic force of the coil spring 127, and the end surface of the opening portion 112b in the rear end portion of the casing 112 of the pickup unit 11 is pressed against the planar portion FL, so that the external light does not enter the inside of the opening portion 112b. As the lens 113 is pushed into the inside against the elastic force of the coil spring 127, the pressing detection switch 124 changes from an off state to an on state, so that the color information pickup operation of the pickup unit 11 is started.

Figure 6:
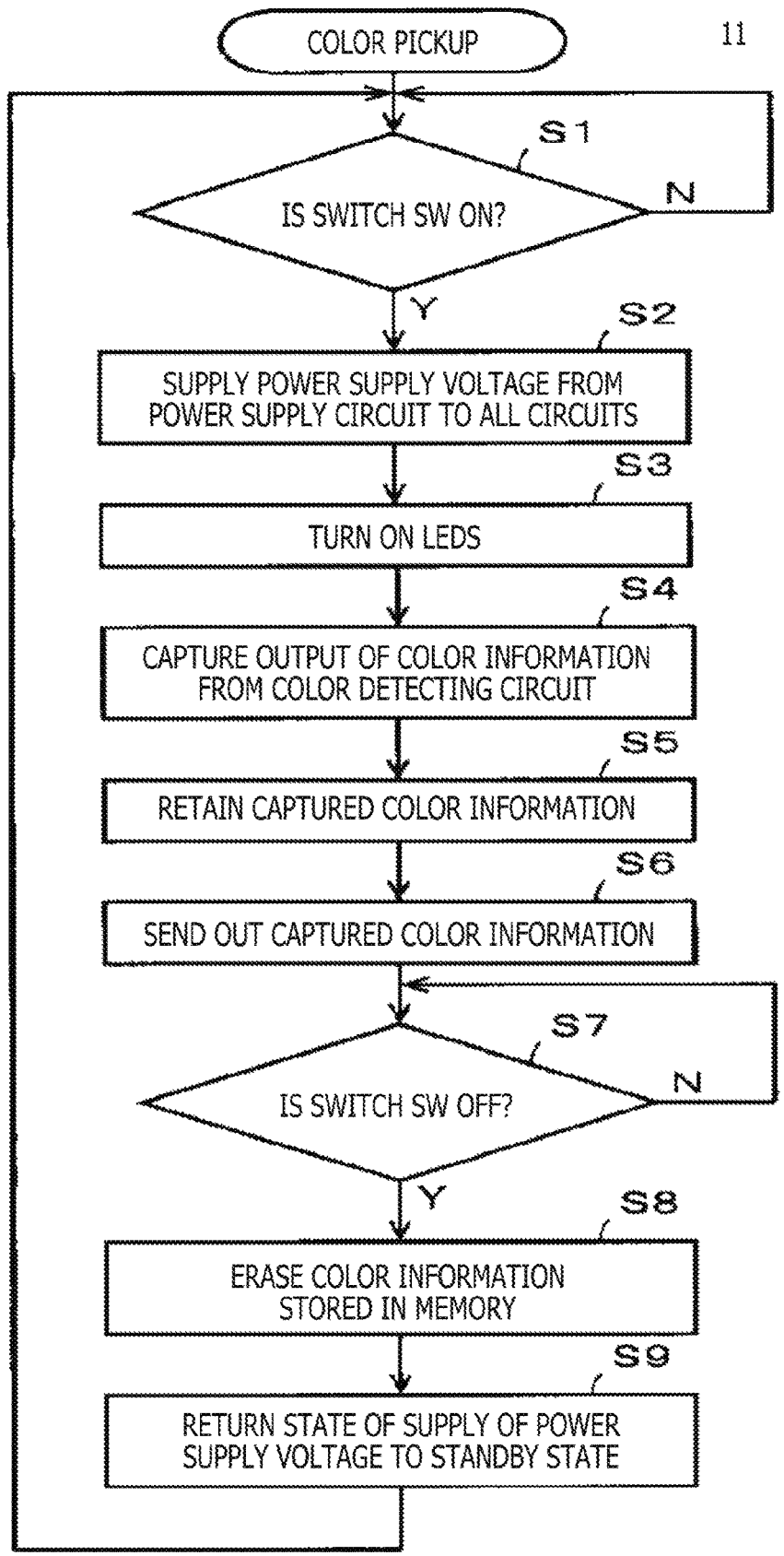
FIG. 6 is a flowchart of assistance in explaining an example of operation of the pickup unit of the electronic pen of the authentication system according to the first embodiment of the present disclosure.

Specifically, as illustrated in FIG. 6, the control circuit 116 of the pickup unit 11 of the electronic pen 1 monitors whether or not the pressing detection switch 124 is changed to the on state (S1). When determining at S1 that the pressing detection switch 124 is changed to the on state, the control circuit 116 performs control so as to supply power supply voltage from the power supply circuit 117 to all of the circuit units within the pickup unit 11 (S2), turns on all of the plurality of LEDs 121, and sets the light receiver 122 and the color detecting circuit 123 in an operable state (S3).

Then, as described earlier, the planar portion FL corresponding to the opening portion 112b of the rear end portion of the pickup unit 11 is irradiated with light emitted from the plurality of LEDs 121, and the reflected light is received by the light receiver 122 through the lens 113. As described earlier, in the present embodiment, the light receiver 122 receives the reflected light as a red light component, a green light component, and a blue light component separately, and outputs light reception outputs corresponding to the light reception levels of the respective components to the color detecting circuit 123. The color detecting circuit 123 in the present embodiment generates color information in the L*a*b* color system from the light reception outputs from the light receiver 122.

Accordingly, following S3, the control circuit 116 captures the color information generated by the color detecting circuit 123 (S4), and temporarily retains the color information in the memory 119 (S5). The control circuit 116 then transmits the color information temporarily retained in the memory 119 to the electronic apparatus 2 through the wireless communication device 118 (S6).

After the user performs an action of pressing the pickup unit 11 against the planar portion FL for a predetermined time, for example, a few seconds to a few ten seconds, the user releases the action of pressing the pickup unit 11 against the planar portion FL. The predetermined time in this case is substantially a time during which the pickup unit 11 can pick up the color information from the planar portion FL and transmit the color information to the electronic apparatus 2, and is for example a few seconds or more. Incidentally, the casing 112 of the pickup unit 11 may be provided with a state notifying display element, for example an LED such that the user can confirm the on state and the off state of the light emitting elements 121, and the state notifying light emitting element may be turned on when the transmission of the color information from the wireless communication device 118 is completed.

When the user releases the action of pressing the pickup unit 11 of the electronic pen 1 against the planar portion FL, the pressing detection switch 124 changes from the on state to the off state.

The control circuit 116 of the pickup unit 11 of the electronic pen 1 monitors for the change of the pressing detection switch 124 from the on state to the off state (S7). When the control circuit 116 determines that the pressing detection switch 124 is changed from the on state to the off state, the control circuit 116 erases the color information stored in the memory 119 (S8), and returns the state of supply of the power supply voltage from the power supply circuit 117 to each circuit to a standby state (S9). Then, following S9, the control circuit 116 returns the processing to S1 to repeat the processing from S1 on down.

Incidentally, as for the erasure of the color information stored in the memory 119 at S8, it suffices to form the memory 119 by using a volatile memory, and stop the supply of the power supply voltage supplied from the power supply circuit 117 to the memory. It is needless to say that in a case where the memory 119 is formed by a nonvolatile memory, the control circuit 116 erases the color information.

<Example of Operation in Electronic Apparatus 2>

Description will next be made of an example of an operation in which the electronic apparatus 2 performs authentication for an authentication target by using, as authentication information, the color information picked up by the pickup unit 11 of the electronic pen 1 as described above, and an operation in which the electronic apparatus 2 uses the color information picked up by the pickup unit 11 of the electronic pen 1 as a writing color and displays the color information on the display screen.

In the electronic apparatus 2 according to the present embodiment, the user registers, in advance, color information to be used for authentication for each target desired to be authenticated by using the color information. The registered color information becomes authentication reference information in the case of determining a success or failure of authentication for the authentication target.

For example, as illustrated in FIG. 7, the starting of each of application programs A, B, and C is registered as an authentication target, and different pieces of color information Ca, Cb, and Cc are registered for the respective authentication targets. In addition, the opening of each of files D and E and a folder F is registered as an authentication target, and different pieces of color information Cd, Ce, and Cf are registered for the respective authentication targets. Correspondence information between the authentication targets and the authentication reference information (correspondence table information) in the example of FIG. 7 is stored and retained in the authentication reference information storage device 205 illustrated in FIG. 5.

It is needless to say that the authentication targets are not limited to the example illustrated in FIG. 7. For example, the starting of operation of the electronic apparatus 2 at a time of turning on power to the electronic apparatus 2 may be set as an authentication target, and the operation of the electronic apparatus 2 may be allowed to be started when authentication based on color information is OK.

Incidentally, while the color information registered as the authentication reference information is illustrated to be different for each authentication target in the example of FIG. 7, it is needless to say that color information obtained by picking up a same color may be used for different authentication targets.

When the registration of the authentication reference information for the authentication targets is thus ended, the electronic apparatus 2 can start to perform a security function for the authentication targets. In authentication of this security function, the electronic apparatus 2 identifies an authentication target, compares and checks color information as information to be authenticated which information is sent from the pickup unit 11 of the electronic pen 1 at a time of the authentication (at a time of performing the security function) against color information as authentication reference information associated with the identified authentication target and stored in the authentication reference information storage device 205, and determines a success or failure of the authentication based on a comparison and check result. Then, only when the authentication is OK, in a case where the authentication target is an application program, the application program can be started, or in a case where the authentication target is a file or a folder, the file or the folder can be opened to use data. In addition, in a case where the authentication target is for example the starting of the operation of the electronic apparatus 2 at a time of turning on power to the electronic apparatus 2, the operation of the electronic apparatus 2 can be started when the authentication based on the color information is OK.

When the security function (authentication) is performed, the user performs, by the pickup unit 11 of the electronic pen 1, an action of picking up the color information as the information to be authenticated which information is to be compared with the authentication reference information to make a success or failure of the authentication determined. In response to this action of the user, the pickup unit 11 of the electronic pen 1 picks up the color information, and transmits the color information to the electronic apparatus 2. Then, the electronic apparatus 2 performs authentication processing for security, determines a success or failure of the authentication, and determines whether or not the authentication target can be used according to a result of the determination.

In addition, the electronic apparatus 2 according to the present embodiment is configured to have a function that enables a writing color to be registered. Specifically, at a time of registration of a writing color, the electronic apparatus 2 obtains color information picked up by the pickup unit 11 of the electronic pen 1 and transmitted wirelessly, and retains the color information in the writing color information storage device 206. Then, the electronic apparatus 2 makes color display of a writing trace of writing input on the position detecting sensor 210 by the electronic pen 1 on the display screen of the display device 203 by using the color information stored in the writing color information storage device 206. Incidentally, the writing trace of the writing input in this case includes not only a line drawing such as a character, a figure, or the like but also a trace of painting by an object such as a paintbrush or a brush for a painting in a case where a type of pen tip of the electronic pen 1 is allowed to be specified by the electronic apparatus 2.

Figure 8:
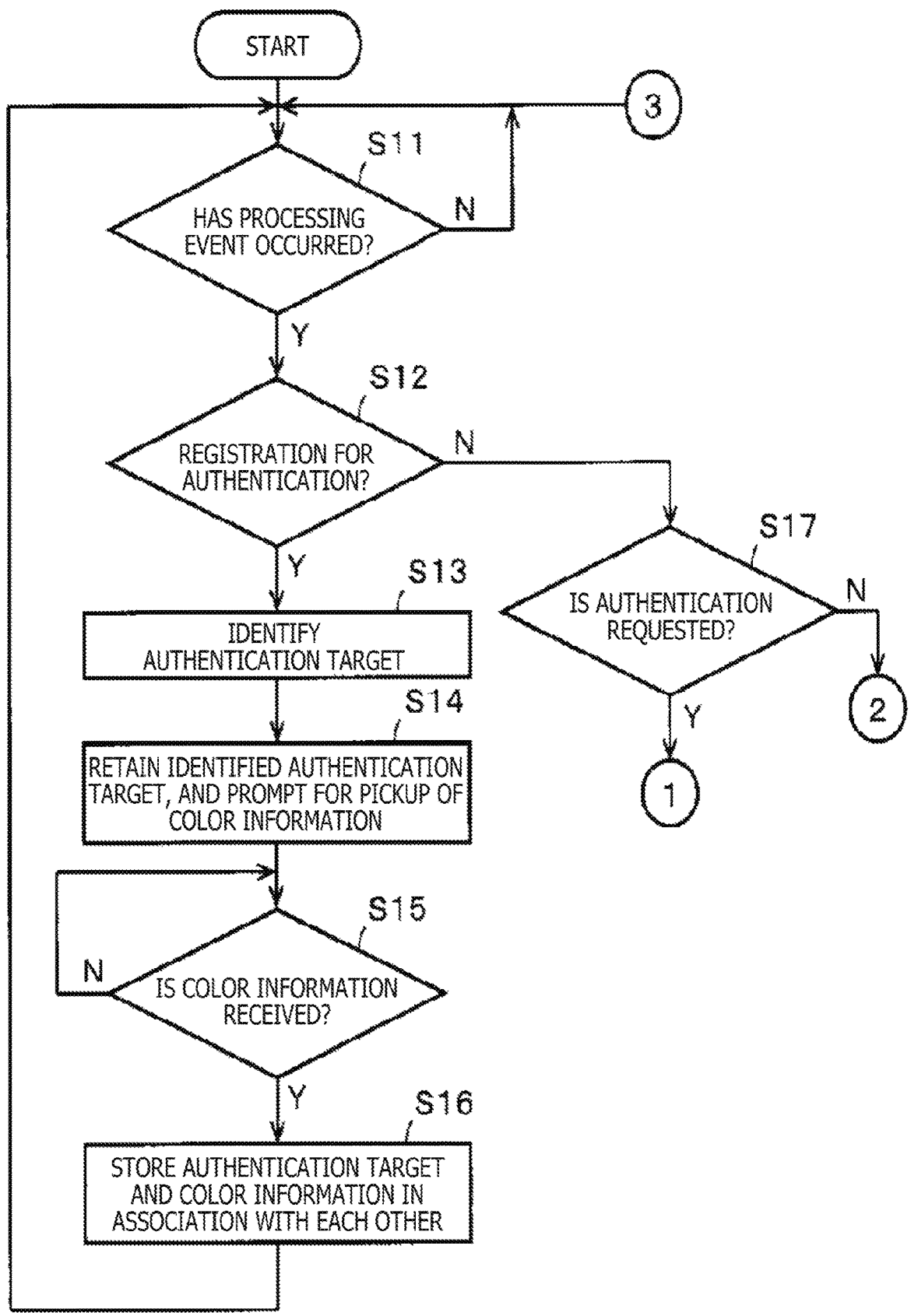
FIG. 8 is a part of a flowchart of assistance in explaining an example of operation of the electronic apparatus of the authentication system according to the first embodiment of the present disclosure.
Figure 9:
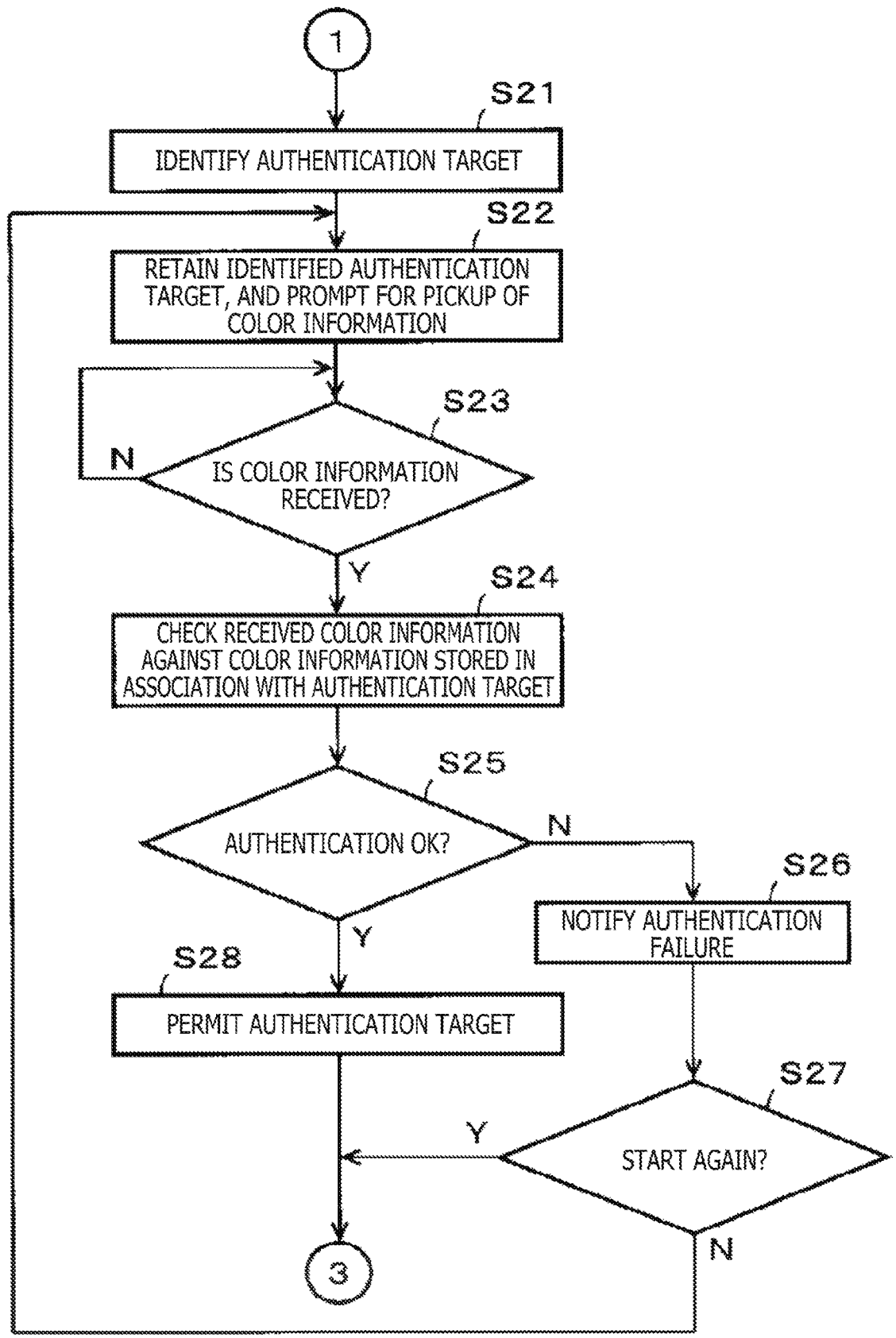
FIG. 9 is a part of the flowchart of assistance in explaining the example of operation of the electronic apparatus of the authentication system according to the first embodiment of the present disclosure.
Figure 10:
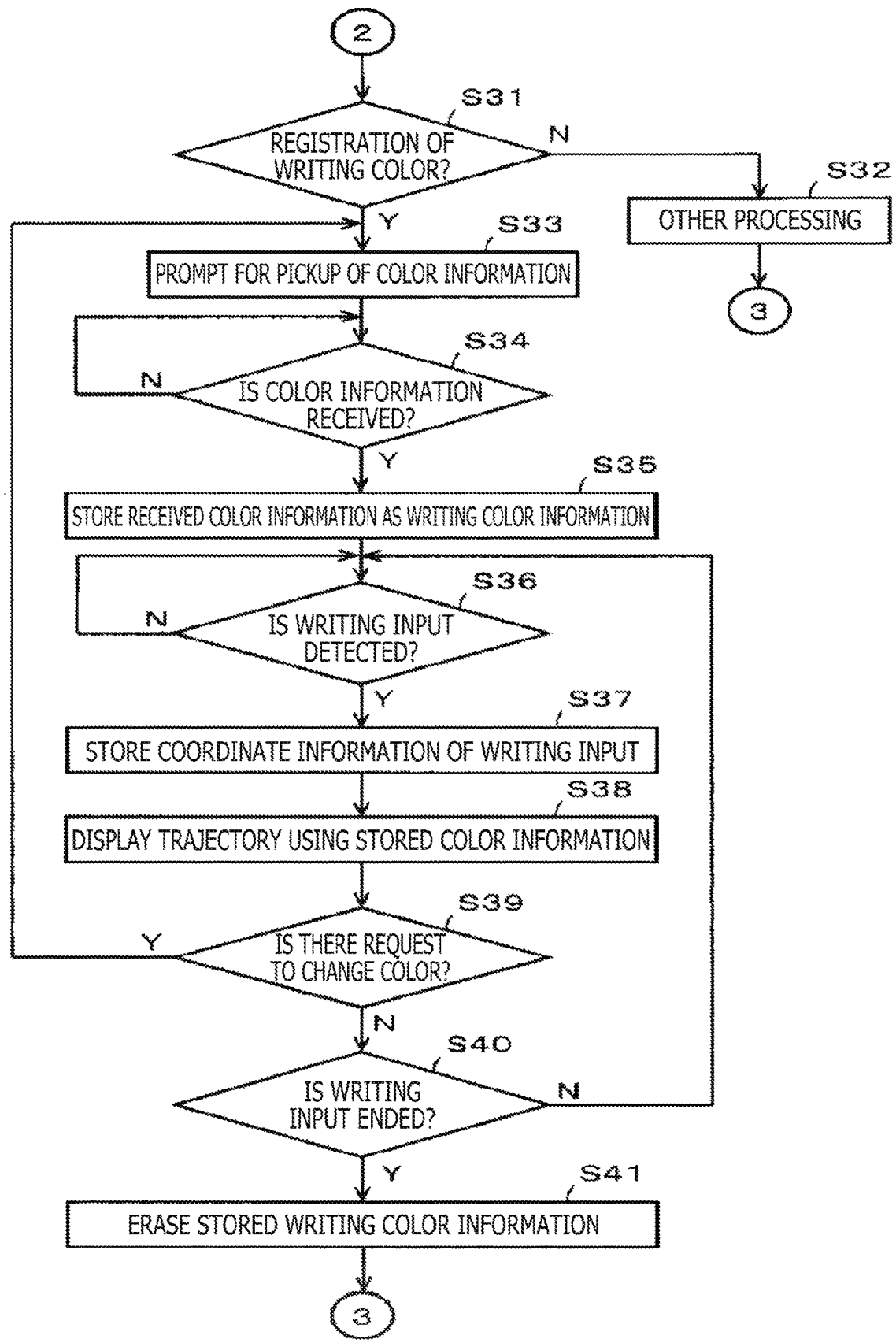
FIG. 10 is a part of the flowchart of assistance in explaining the example of operation of the electronic apparatus in the first embodiment of the authentication system according to the present disclosure.

An example of a flow of operation in the electronic apparatus 2 described above will be described with reference to flowcharts of FIGS. 8 to 10. Incidentally, description will be made supposing that the processing of each act in FIGS. 8 to 10 is performed by the information processing control circuit 200 of the electronic apparatus 2.

The information processing control circuit 200 first determines whether or not some processing event based on an input operation of the user has occurred (S11). When determining at S11 that some processing event has occurred, the information processing control circuit 200 first determines whether or not the processing event is "registration for authentication" (S12).

When determining at S12 that the processing event is "registration for authentication," the information processing control circuit 200 identifies an authentication target based on a situation of the occurrence of the processing event at S11 (S13). At S13, in a case where the processing event determined at S11 for example includes an instruction indicating registration of authentication reference information for starting an application program that is specified by the processing event or is being executed at the time of the processing event, the authentication target is the starting of the application program. In addition, in a case where the processing event includes an instruction indicating registration of authentication reference information for opening a file or a folder, the authentication target is the opening of the file or the folder.

Next, the information processing control circuit 200 retains information regarding the authentication target identified at S13, and prompts the user to pick up color information as authentication reference information (S14).

Responding to the prompt at S14, the user performs an action of pressing the rear end side of the pickup unit 11 of the electronic pen 1 against the planar portion FL that exhibits a color that the user desires to use as authentication reference information, as described with reference to FIG. 6. Then, as described earlier, the color information is wirelessly transmitted from the pickup unit 11 of the electronic pen 1, and thus the electronic apparatus 2 receives the color information through the wireless communication device 204.

After prompting for pickup of the color information at S14, the information processing control circuit 200 of the electronic apparatus 2 waits to receive the color information picked up by the user responding to the prompt (S15). When the information processing control circuit 200 determines that the reception of the color information is confirmed at S15, the information processing control circuit 200 stores, in the authentication reference information storage device 205, the information regarding the authentication target identified in S13 and the received color information as table information associated as illustrated in FIG. 7 (S16). The information processing control circuit 200 then returns the processing to S11 to repeat the processing from S11 on down.

When determining at S12 that the generated processing event is not "registration for authentication," the information processing control circuit 200 determines whether or not the generated processing event requests "authentication" (S17). At S17, the information processing control circuit 200 determines whether or not the processing event identified at S11 is related to an authentication target stored in the authentication reference information storage device 205 and needs authentication.

When determining at S17 that "authentication" is requested, the information processing control circuit 200 identifies an authentication target based on the processing event generated at S11 and the information stored in the authentication reference information storage device 205 (S21 in FIG. 9).

Then, the information processing control circuit 200 retains information regarding the identified authentication target, and prompts the user to pick up color information as information to be authenticated for performing the authentication (S22).

Responding to the prompt at S22, in order to obtain identical color information as color information registered for the authentication target specified by the user, the user performs an action of pressing the rear end side of the pickup unit 11 of the electronic pen 1 against the planar portion FL exhibiting the same color as the registered color, as described with reference to FIG. 6. Then, as described earlier, the color information is wirelessly transmitted from the pickup unit 11 of the electronic pen 1, and thus the electronic apparatus 2 receives the color information as information to be authenticated through the wireless communication device 204.

Specifically, after prompting for pickup of the color information at S22, the information processing control circuit 200 of the electronic apparatus 2 waits to receive the color information picked up by the user responding to the prompt (S23). When determining at S23 that the reception of the color information is confirmed, the information processing control circuit 200 checks the color information as the information to be authenticated which information is received at S23 against the color information of authentication reference information stored in the authentication reference information storage device 205 and stored in association with the authentication target identified at S21 (S24), and determines whether or not the authentication is OK (S25).

At S24 and S25, a success or failure of the authentication is determined based on whether the color information stored in the authentication reference information storage device 205 and the color information received at S23 match each other. Specifically, as described earlier, a difference between the color information of the authentication reference information and the color information as the information to be authenticated is calculated, and it is determined that the authentication is OK when the difference is equal to or less than the threshold value, or it is determined that the authentication is FAILURE when the difference exceeds the threshold value.

When determining at S25 that the authentication is not OK but the authentication is FAILURE, the information processing control circuit 200 notifies the user by displaying the authentication FAILURE on the display screen of the display device 203 and emitting an alarm sound, for example (S26). Then, following S26, the information processing control circuit 200 makes an inquiry as to whether or not to start the authentication again, and determines a response from the user (S27). When determining that a response indicating that the authentication is to be started again is obtained at S27, the information processing control circuit 200 returns the processing to S22 to repeat the processing from S22 on down. When determining at S27 that a response indicating that the authentication is not to be started again is obtained, the information processing control circuit 200 returns the processing to S11 in FIG. 8 to repeat the processing from S11 on down.

When determining at S25 that the authentication is OK, the information processing control circuit 200 removes security protection, and permits the authentication target (S28). Permitted at S28 is the starting of an application program as the authentication target or the opening of a file or a folder as the authentication target. The information processing control circuit 200 then returns the processing to S11 in FIG. 8 to repeat the processing from S11 on down.

Next, when determining at S17 in FIG. 8 that the processing event does not request "authentication," the information processing control circuit 200 determines whether or not the processing event is "writing color registration" (S31 in FIG. 10). The determination at S31 is made according to whether or not the processing event generated at S11 is for example a processing event based on the clicking of an icon "writing color registration" displayed on the display screen of the electronic apparatus 2 while the user is for example performing writing input on the position detecting sensor 210 of the electronic apparatus 2 by using the electronic pen 1.

When determining at S31 that the processing event is not "writing color registration," the information processing control circuit 200 performs other processing for the processing event (S32), and thereafter returns the processing to S11 in FIG. 8 to repeat the processing from S11 on down.

When determining at S31 that the processing event is "writing color registration," the information processing control circuit 200 prompts the user to pick up color information as writing color information (S33).

Responding to the prompt at S33, the user performs an action of pressing the rear end side of the pickup unit 11 of the electronic pen 1 against the planar portion FL that exhibits a color that the user desires to use as authentication reference information, as described with reference to FIG. 6. Then, as described earlier, color information is wirelessly transmitted from the pickup unit 11 of the electronic pen 1, and thus the electronic apparatus 2 receives the color information through the wireless communication device 204.

After prompting for pickup of the color information at S33, the information processing control circuit 200 of the electronic apparatus 2 monitors for reception of the color information picked up by the user responding to the prompt (S34). When determining that the color information is received, the information processing control circuit 200 stores the received color information as writing color information in the writing color information storage device 206 (S35).

In the present embodiment, the electronic apparatus 2 is configured to be able to receive writing input from the electronic pen 1 through the position detecting sensor 210 after storing the writing color information in the writing color information storage device 206 at S35. Accordingly, the user changes the electronic pen 1 from a state in which the rear end portion of the pickup unit 11 is pressed against the planar portion FL as illustrated in the center of FIG. 5 to a state in which writing input is performed with the pen tip of the electronic pen 1 set in proximity to or in contact with an input region of the position detecting sensor 210 of the electronic apparatus 2, as illustrated on the left side of the center of FIG. 5.

Following S35, the information processing control circuit 200 determines whether or not writing input by the electronic pen 1 is detected based on whether or not a signal at a predetermined level or higher is received from the electronic pen 1 through the position detecting sensor 210 (S36). The information processing control circuit 200 thus monitors for writing input. Then, when determining at S36 that writing input is detected, the information processing control circuit 200 stores coordinate information of a trajectory of the detected writing input (S37), and makes color display of the trajectory of the writing input on the display screen of the display device 203 by using the color information (writing color information) stored in the writing color information storage device 206 (S38).

Next, the information processing control circuit 200 determines whether or not a request to change the writing color is made by the user (S39). When determining that the request to change the writing color is made, the information processing control circuit 200 returns the processing to S33 to repeat the processing from S33 on down. When determining at S39 that the request to change the writing color is not made by the user, the information processing control circuit 200 determines whether or not the writing input is ended (S40). When determining that the writing input is not ended, the information processing control circuit 200 returns the processing to S36 to repeat the processing from S36 on down. When determining at S40 that the writing input is ended, the information processing control circuit 200 erases the color information of the writing color stored in the writing color information storage device 206 (S41). The information processing control circuit 200 thereafter returns the processing to S11 in FIG. 8 to repeat the processing from S11 on down.

As described above, according to the electronic pen of the foregoing first embodiment, authentication for the authentication target can be performed by using the color information picked up by the pickup unit 11 coupled to the electronic pen main body unit 10. In this case, it suffices for the user only to perform an operation of pressing the rear end portion of the pickup unit 11 coupled to the rear end side of the electronic pen main body unit 10 against the planar portion exhibiting a color desired to be used for the authentication. Thus, good usability is provided.

In addition, because the color information picked up by the pickup unit 11 is used for the authentication, it suffices for the user to remember the color used for the authentication. It is therefore possible to reduce a possibility of forgetting information for the authentication as compared with a case where a plural-digit number, a symbol, and the like are used for the authentication. In addition, because it suffices for the user only to perform an operation of pressing the rear end portion of the pickup unit 11 against the planar portion exhibiting a color used for the authentication as an operation of inputting information for the authentication, there is also an advantage in that an input operation error as in the case of inputting a plural-digit number, a symbol, and the like does not occur easily, and thus input operation is easy.

In addition, in the foregoing first embodiment, the color information picked up by the pickup unit 11 can be used as the display color of the writing trace of the writing input on the position detecting sensor 210 by the electronic pen 1. In this case, the color information picked up by the pickup unit 11 can be used as the display color of the writing trace as it is. Thus, the writing trace can be expressed in a color intended by the user, and convenience is provided. Incidentally, the color information stored in the writing color information storage device 206 may be stored in association with the coordinate information of the writing input which coordinate information is stored in the electronic apparatus 2.

Incidentally, in the description of the foregoing embodiment, as for the color information transmitted from the pickup unit 11 of the electronic pen 1, color information as the authentication reference information, color information as the information to be authenticated, and color information as the writing color information are distinguished from each other by changing storage devices. However, needless to say, the respective pieces of color information may be stored after indexes for distinguishing the respective pieces of color information for authentication reference, for being authenticated, and for the writing color are added as additional information.

In addition, in the description of the foregoing first embodiment, the transmission of the color information picked up by the pickup unit 11 to the electronic apparatus 2 is performed from the wireless communication device 118 included in the pickup unit 11. However, a wireless communication device may be provided to the electronic pen main body unit 10 without the wireless communication device 118 being provided to the pickup unit 11, and the control circuit 103 of the electronic pen main body unit 10 may be configured to obtain the color information from the pickup unit 11 through the USB interface 107, and transmit the color information by using the wireless communication device provided to the electronic pen main body unit 10.

In addition, without the wireless communication device 118 being provided to the pickup unit 11, the control circuit 103 of the electronic pen main body unit 10 may obtain the color information from the pickup unit 11 through the USB interface 107, and supply the position detecting sensor 210 with the color information in a state of being included in the signal sent out through the core body 105. The color information may be thus transmitted to the electronic apparatus 2 by interaction between the electronic pen main body unit 10 and the position detecting sensor 210.

In addition, in the description of the foregoing first embodiment, the pickup unit 11 is configured to be connected by USB to the electronic pen main body unit 10 of the electronic pen 1, and receive the power supply voltage from the electronic pen main body unit 10. However, a battery (that may be a primary battery or a secondary battery) may be provided within the casing 112 of the pickup unit 11. In that case, in the configuration in which the color information is transmitted to the electronic apparatus 2 through the wireless communication device 118 of the pickup unit 11, the pickup unit 11 and the electronic pen main body unit 10 do not need to be electrically connected to each other, and therefore it suffices to be able to simply couple the pickup unit 11 and the electronic pen main body unit 10 to each other. Then, at a time of pickup of the color information by the pickup unit 11, the pickup unit 11 can be detached from the electronic pen main body unit 10, and be made to perform a pickup operation by pressing the pickup unit 11 against the planar portion FL.

[Modifications of Pickup Unit According to Foregoing Embodiment]

Incidentally, the pickup unit according to the foregoing embodiment has a configuration in which the lens is moved by being pushed in when the rear end portion of the pickup unit is pressed against the planar portion, and the pickup unit is started when the pressing detection switch detects the pressing of the lens by the movement. However, there is no limitation to such a configuration.

For example, a skirt portion formed by an elastic body such as silicon rubber or the like is provided to the rear end portion of the pickup unit such that the skirt portion protrudes outward in the axial direction of the pickup unit from a peripheral edge portion of the lens. A part enclosed by the skirt portion is blocked from the external light by close contact between an edge portion of the skirt portion and the planar portion when the rear end portion of the pickup unit is pressed against the planar portion, and the phototransistors detect the presence or absence of the external light. Thus, the phototransistors can detect that the part enclosed by the skirt portion is blocked from the external light when the rear end portion of the pickup unit is pressed against the planar portion. Therefore, based on detection outputs of the phototransistors, the pickup unit may be started, and the LEDs may be turned on.

In addition, a contact sensor that detects contact with the planar portion and a pressure sensor that detects a pressing force from the planar portion may be provided to a casing part of the rear end portion of the pickup unit. Based on detection outputs of the contact sensor and the pressure sensor, the pickup unit may be started, and the LEDs may be turned on.

Second Embodiment

The foregoing first embodiment uses only color information as the authentication information. A second embodiment represents a case where the authentication system has a configuration including the electronic pen and the electronic apparatus described with reference to FIG. 1 in the first embodiment, and security can be made to be stronger by using not only color information but also identifying information of the electronic pen (which identifying information will hereinafter be referred to as pen ID information) as the authentication reference information.

The authentication system according to the second embodiment includes an electronic pen 1A different from the electronic pen 1 according to the first embodiment in that the electronic pen 1A has a pen ID information storage device and an electronic apparatus different from the electronic apparatus 2 according to the first embodiment in terms of the configuration of a processing function related to authentication processing.

Figure 11:
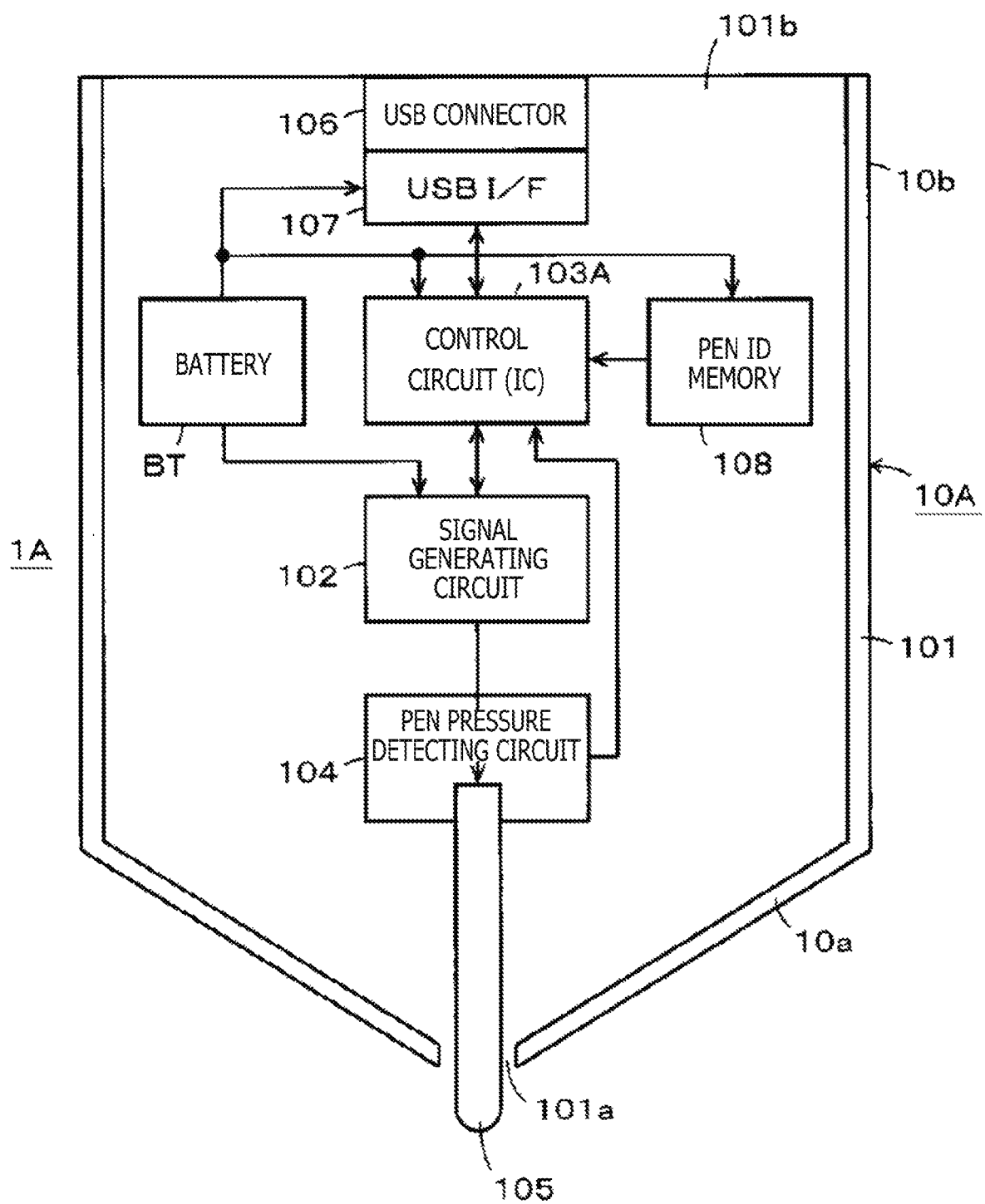
FIG. 11 is a block diagram illustrating an example of a configuration of an electronic pen main body unit of an electronic pen of an authentication system according to a second embodiment of the present disclosure.

The electronic pen 1A according to the second embodiment includes an electronic pen main body unit 10A (see FIG. 11) and a pickup unit 11A (not illustrated in FIG. 11). As illustrated in FIG. 11, a hardware configuration of the electronic pen main body unit 10A of the electronic pen 1A according to the second embodiment is different from that of the electronic pen 1 according to the first embodiment in that the hardware configuration of the electronic pen main body unit 10A of the electronic pen 1A according to the second embodiment includes a control circuit 103A different from the control circuit 103 in terms of control processing contents, and a pen ID memory 108 is connected to the control circuit 103A. The pen ID memory 108 stores pen ID information for identifying each electronic pen 1A.

Other configurations of the electronic pen main body unit 10A are similar to those of the electronic pen main body unit 10 of the electronic pen 1 according to the first embodiment illustrated in FIG. 5. Incidentally, in FIG. 11, the same parts as in the electronic pen main body unit 10 of the electronic pen 1 according to the first embodiment are identified by the same reference symbols.

Though not illustrated in FIG. 11, the pickup unit 11A of the electronic pen 1A according to the second embodiment has a hardware configuration similar to that of the pickup unit 11 of the electronic pen 1 according to the first embodiment described with reference to FIGS. 3A and 3B and FIG. 4 except that the pickup unit 11A includes a control circuit (not illustrated) different from the control circuit 116 of the pickup unit 11 of the electronic pen 1 according to the first embodiment in terms of control contents.

In addition, a hardware configuration of the electronic apparatus according to the second embodiment includes an information processing control circuit (not illustrated) different from the information processing control circuit 200 of the electronic apparatus 2 according to the first embodiment illustrated in FIG. 5 in terms of control processing contents, and includes an authentication reference information storage device (not illustrated) different from the authentication reference information storage device 205 of the electronic apparatus 2 according to the first embodiment in terms of authentication reference information stored in the authentication reference information device. In addition, the hardware configuration of the electronic apparatus according to the second embodiment includes a writing color information storage device (not illustrated) different from the writing color information storage device 206 in terms of writing color information stored in the writing color information storage device. Other configurations of the electronic apparatus according to the second embodiment are similar to those of the electronic apparatus 2 according to the first embodiment.

In the second embodiment, when the pickup unit 11A of the electronic pen 1A picks up color information with the rear end portion of the pickup unit 11A pressed against the planar portion FL, the pickup unit 11A performs an operation of picking up the color information in a similar manner to the pickup unit 11 according to the first embodiment. However, the control circuit of the pickup unit 11A according to the second embodiment does not immediately transmit the picked-up color information to the electronic apparatus but temporarily retains the picked-up color information, and transmits a pen ID information obtainment request to the electronic pen main body unit 10A via the USB interface 115 and the USB connector plug 111.

When the control circuit 103A of the electronic pen main body unit 10A of the electronic pen 1A receives the pen ID information obtainment request from the pickup unit 11A through the USB connector jack 106 and the USB interface 107, the control circuit 103A transmits the pen ID information read from the pen ID memory 108 to the pickup unit 11A through the USB interface 107 and the USB connector jack 106.

When the control circuit of the pickup unit 11A according to the second embodiment obtains the pen ID information from the electronic pen main body unit 10A, the control circuit transmits the retained color information and the obtained pen ID information to the electronic apparatus 2 through the wireless communication device 118.

Referring to flowcharts, description will be further made of an example of a flow of operation of the electronic pen 1A and a flow of operation of the electronic apparatus in the second embodiment.

<Description of Color Information Pickup Operation by Pickup Unit 11A of Electronic Pen 1A>

First, referring to a flowchart of FIG. 12, description will be made of an example of a flow of color information obtaining operation in the pickup unit 11A of the electronic pen 1A. Incidentally, the description will be made supposing that the operation of each act in FIG. 6 is performed by the control circuit (not illustrated) of the pickup unit 11A.

Figure 12:
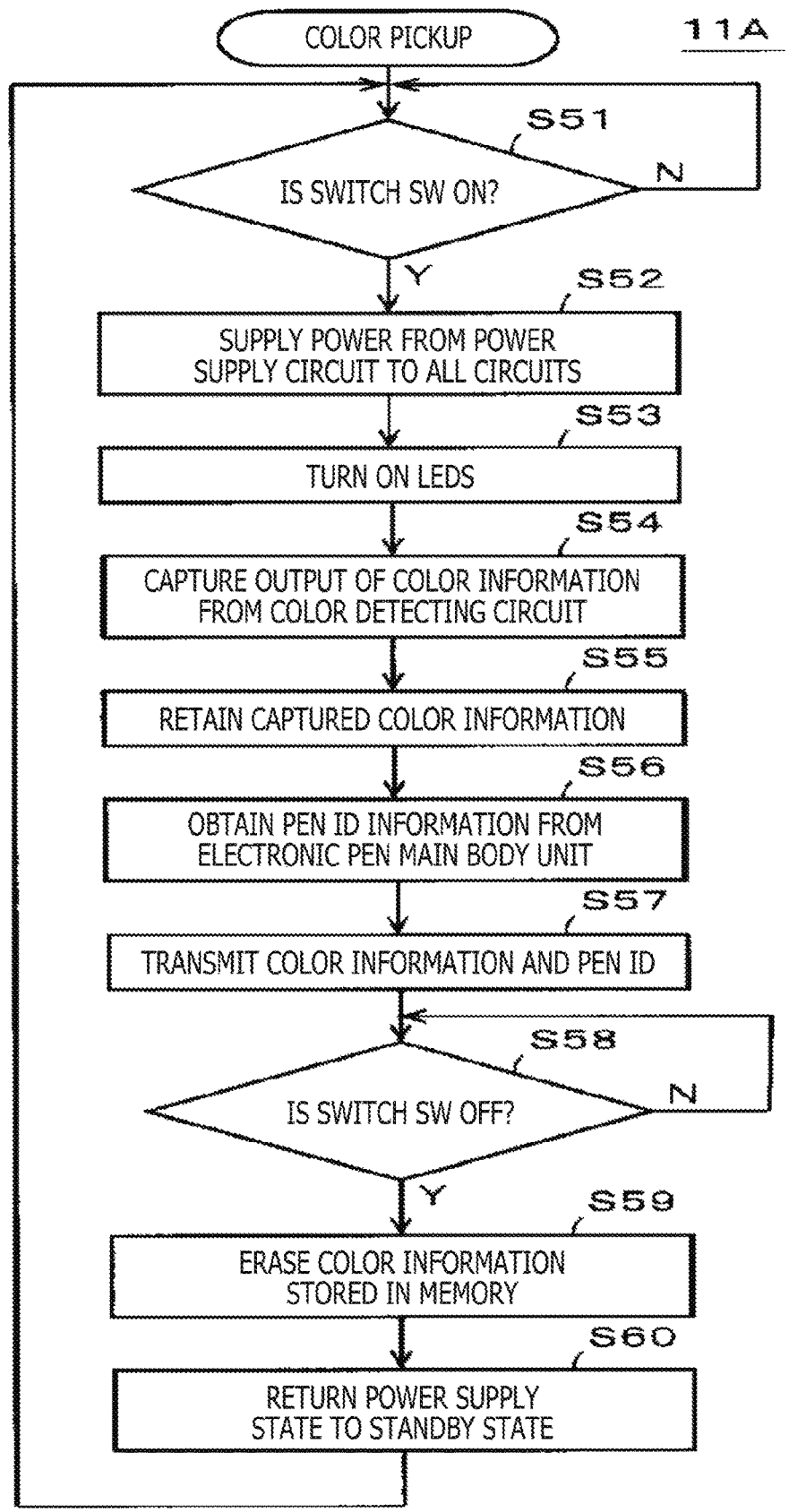
FIG. 12 is a flowchart of assistance in explaining an example of operation of a pickup unit of an electronic pen of the authentication system according to the second embodiment of the present disclosure.

Also, in the electronic pen 1A according to the second embodiment, the operation at S51 to S55 in FIG. 12 is similar to the operation at S1 to S5 in FIG. 6. Specifically, when the user presses the rear end side of the pickup unit 11A against a part of the planar portion FL which part exhibits a color that the user desires to pick up in a state in which the pen tip portion 10a side of the electronic pen 1A is oriented upward, the pressing detection switch 124 changes from an off state to an on state (S51), power is supplied to each part of the pickup unit 11A (S52), the LEDs 121 are turned on (S53), an operation of obtaining the color information is performed (S54), and the obtained color information is temporarily retained in the memory 119 (S55).

In the pickup unit 11A of the electronic pen 1A according to the second embodiment, following S55, the control circuit sends a pen ID information obtainment request to the electronic pen main body unit 10A through the USB interface 115, and obtains the pen ID information sent from the electronic pen main body unit 10A in response to the pen ID information obtainment request through the USB interface 115 (S56).

Next, the control circuit transmits the color information temporarily retained in the memory 119 and the pen ID information obtained from the electronic pen main body unit 10A to the electronic apparatus 2 through the wireless communication device 118 (S57).

Then, the control circuit of the pickup unit 11A of the electronic pen 1A monitors for a change of the pressing detection switch 124 from the on state to the off state which change is caused by the user by releasing the state of pressing the rear end side of the electronic pen 1A against the planar portion FL (S58). When the control circuit determines that the pressing detection switch 124 is changed from the on state to the off state, the control circuit erases the color information stored in the memory 119 (S59), and returns the state of supply of the power supply voltage from the power supply circuit 117 to each circuit to a standby state (S60). Then, following S60, the control circuit returns the processing to S51 to repeat the processing from S51 on down.

<Example of Operation in Electronic Apparatus>

In the electronic apparatus according to the second embodiment, at a time of registration of authentication targets and authentication reference information, color information and pen ID information registered for each registered authentication target become authentication reference information for determining a success or failure of authentication for the authentication target.

Specifically, in the second embodiment, as illustrated in FIG. 13, for example, the starting of each of application programs A, B, and C is registered as an authentication target, and different pieces of color information Ca, Cb, and Cc and pen ID information IDa, IDb, and IDc are registered in association with the respective authentication targets. In addition, the opening of each of files D and E is registered as an authentication target, and different pieces of color information Cd and Ce and pen ID information IDd and IDe are registered in association with the respective authentication targets.

Correspondence information (correspondence table information) between the authentication targets and the authentication reference information in the example of FIG. 13 is stored and retained in the authentication reference information storage device as in the first embodiment. While the color information is illustrated to be different for each authentication target in the example of FIG. 13, it is needless to say that color information obtained by picking up a same color may be used for different authentication targets. In addition, while the pen ID information is illustrated to be different for each authentication target, same pen ID information may be used for different authentication targets, or identical pen ID information may be used for all of the authentication targets.

In the second embodiment, information transmitted from the pickup unit 11A of the electronic pen 1A to the electronic apparatus is a pair of picked-up color information and pen ID information. The electronic apparatus stores the information of the pair of the color information and the pen ID information as writing color information in the writing color information storage device 206.

In addition, in the second embodiment, the control circuit 103A of the electronic pen 1A controls the signal generating circuit 102 so as to include the pen ID information in a signal sent out from the core body 105 of the electronic pen main body unit 10A. The pen ID information is included in the signal from the core body 105 together with a position detection signal and pen pressure information by a multiplex system such as a time division multiplexing, a frequency division multiplexing, or the like. Alternatively, as in the foregoing, the pen ID information may be converted as digital information into a modulated signal such as an OOK signal, an ASK signal, or the like.

In the electronic apparatus, the information processing control circuit receives the signal transmitted from the core body 105 of the electronic pen main body unit 10A of the electronic pen 1A, and compares the pen ID information included in the signal with the pen ID information stored in the writing color information storage device 206. When the two pieces of pen ID information match each other, the information processing control circuit makes color display of a writing trace based on writing input by a pen tip of a core body of the electronic pen main body unit 10A of the electronic pen 1A by using the color information stored in the writing color information storage device 206. In addition, when the pen ID information added to the signal from the core body 105 of the electronic pen main body unit 10A of the electronic pen 1 and the pen ID information stored in the writing color information storage device 206 do not match each other, the information processing control circuit displays the writing trace based on the writing input by the pen tip of the core body 105 of the electronic pen main body unit 10A of the electronic pen 1A in a default color, for example black. Thus, only at a time of writing input of the electronic pen 1A for which the writing color information is registered, color display of the writing trace of the writing input can be made in the registered color.

An example of a flow of operation in the electronic apparatus according to the second embodiment will be described with reference to flowcharts of FIGS. 14 to 17. Incidentally, the description will be made supposing that the processing of each act in FIGS. 14 to 17 is performed by the information processing control circuit of the electronic apparatus.

Figure 14:
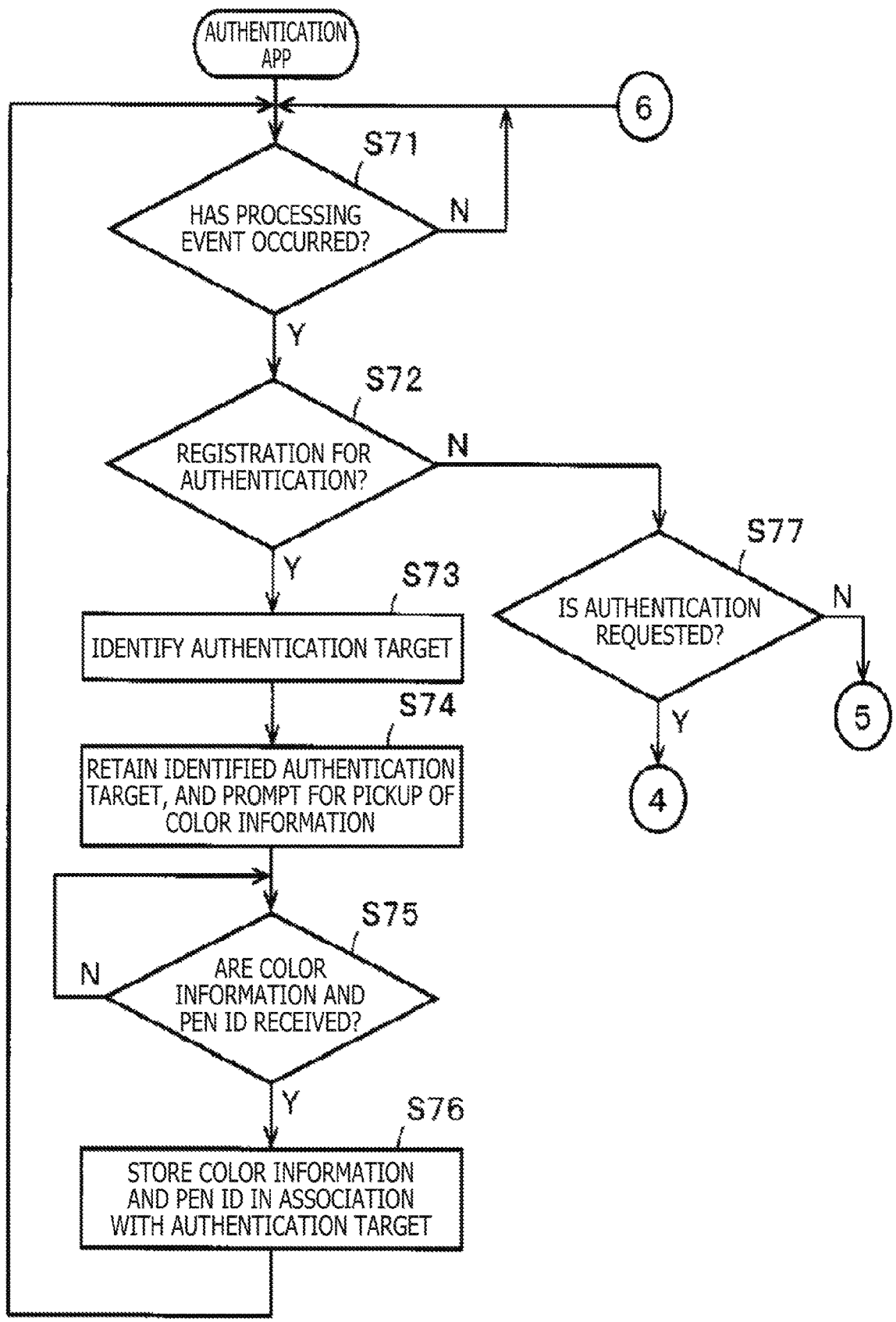
FIG. 14 is a part of a flowchart of assistance in explaining an example of operation of an electronic apparatus of the authentication system according to the second embodiment of the present disclosure.
Figure 15:
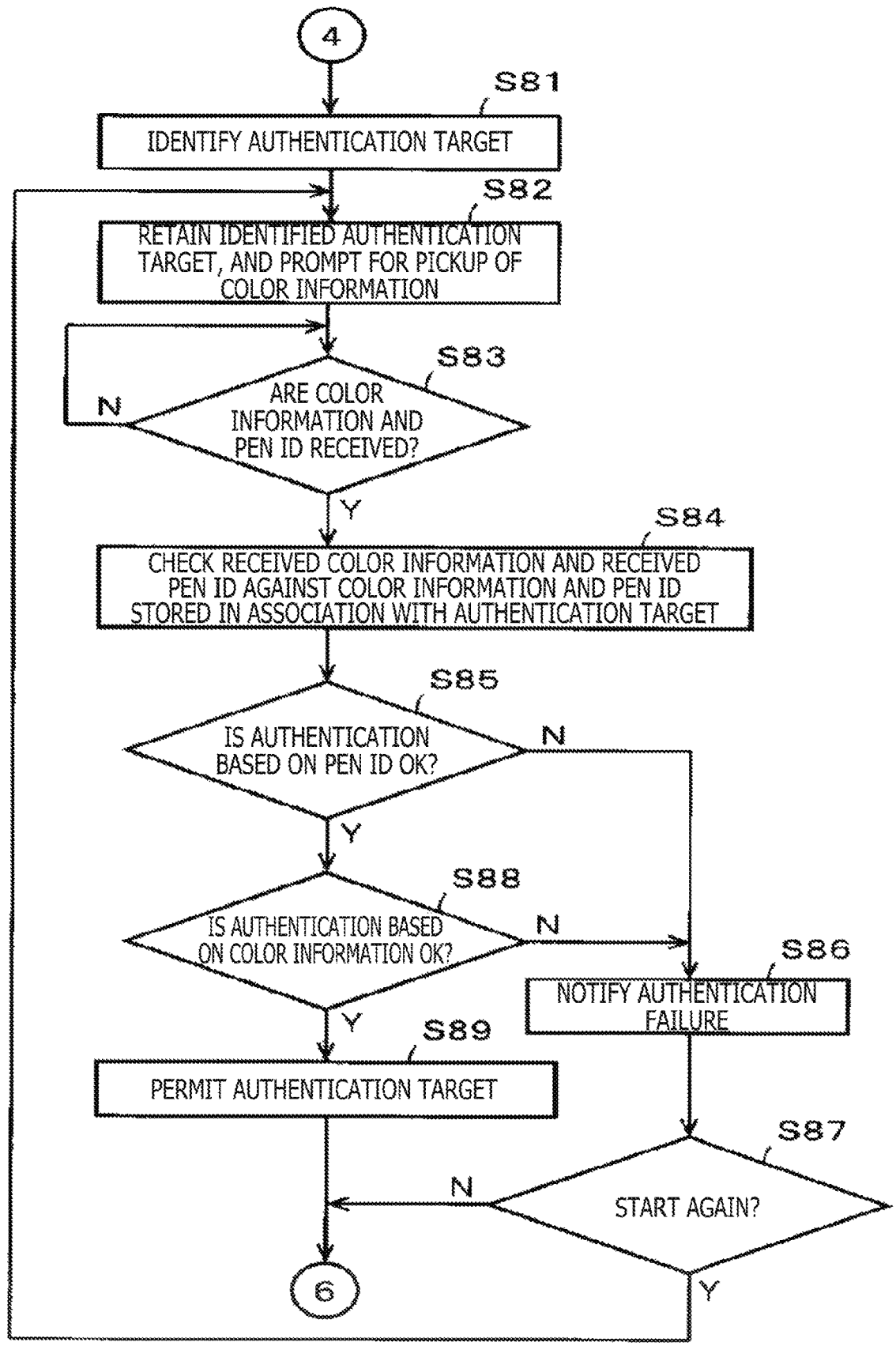
FIG. 15 is a part of the flowchart of assistance in explaining the example of operation of the electronic apparatus of the authentication system according to the second embodiment of the present disclosure.

The processing at S71 to S74 in FIG. 14 is similar to the processing at S11 to S14 in FIG. 8 in the first embodiment, and therefore description thereof will be omitted here. In the second embodiment, after the processing of prompting for pickup of color information at S74, the color information and the pen ID information are sent from the pickup unit 11A of the electronic pen 1A. Therefore, processing from S74 on down is different from the first embodiment.

Specifically, the information processing control circuit of the electronic apparatus according to the second embodiment monitors for reception of the color information and the pen ID information to be sent from the pickup unit 11A of the electronic pen 1A (S75). When determining that the color information and the pen ID information are received, the information processing control circuit stores the received color information and the received pen ID information in the authentication reference information storage device in association with authentication target information received at S73, as illustrated in FIG. 13 (S76).

Following S76, the information processing control circuit returns the processing to S71 to repeat the processing from S71 on down.

Then, when the information processing control circuit determines at S72 that the generated processing event is not "registration for authentication," the information processing control circuit determines whether or not the generated processing event requests "authentication" (S77). When determining at S77 that "authentication" is requested, the information processing control circuit identifies an authentication target based on the processing event generated at S71 and the information stored in the authentication reference information storage device (S81 in FIG. 15).

Then, the information processing control circuit retains information regarding the identified authentication target, and prompts the user to pick up color information as information to be authenticated for performing the authentication (S82).

In response to the prompt at S82, in the second embodiment, the color information and the pen ID information are sent from the pickup unit 11A of the electronic pen 1A. Thus, the information processing control circuit monitors for reception of the color information and the pen ID information (S83). When determining that the color information and the pen ID information are received, the information processing control circuit checks each of the received color information and the received pen ID information against the color information and the pen ID information as the authentication reference information stored in the authentication reference information storage device 205 (S84).

Then, in the present example, the information processing control circuit first determines whether or not authentication based on the pen ID information is OK based on whether or not the pen ID information of the authentication reference information and the pen ID information of the information to be authenticated exactly match each other (S85).

When determining at S85 that the pen ID information of the authentication reference information and the pen ID information of the information to be authenticated do not exactly match each other, and that thus the authentication is not OK, the information processing control circuit notifies the user by displaying the authentication FAILURE on the display screen of the display device 203 and emitting an alarm sound, for example (S86).

Then, following S86, the information processing control circuit 200 makes an inquiry as to whether or not to start the authentication again, and determines a response from the user (S87). When determining at S87 that a response indicating that the authentication is to be started again is obtained, the information processing control circuit returns the processing to S82 to repeat the processing from S82 on down. When determining at S87 that a response indicating that the authentication is not to be started again is obtained, the information processing control circuit returns the processing to S71 in FIG. 14 to repeat the processing from S71 on down.

Then, when determining at S85 that the pen ID information of the authentication reference information and the pen ID information of the information to be authenticated exactly match each other, and that thus the authentication is OK, the information processing control circuit determines whether or not the authentication is OK based on whether a difference between the color information stored in the authentication reference information storage device and the color information received at S84 is equal to or less than the threshold value (S88). When determining at S88 that the difference between the color information of the authentication reference information and the color information of the information to be authenticated exceeds the threshold value, and that thus the authentication is not OK, the information processing control circuit moves the processing to S86, where the information processing control circuit notifies the user by displaying the authentication FAILURE on the display screen of the display device 203 and emitting an alarm sound, for example. The information processing control circuit further performs the processing from S87 on down.

In addition, when determining at S88 that the difference between the color information of the authentication reference information and the color information of the information to be authenticated is equal to or less than the threshold value, and that thus the authentication is OK, that is, when determining that the authentication based on the pen ID information is OK and that the authentication based on the color information is OK, the information processing control circuit permits the authentication target (S89). Then, the information processing control circuit returns the processing to S71 in FIG. 14 to repeat the processing from S71 on down.

Figure 16:
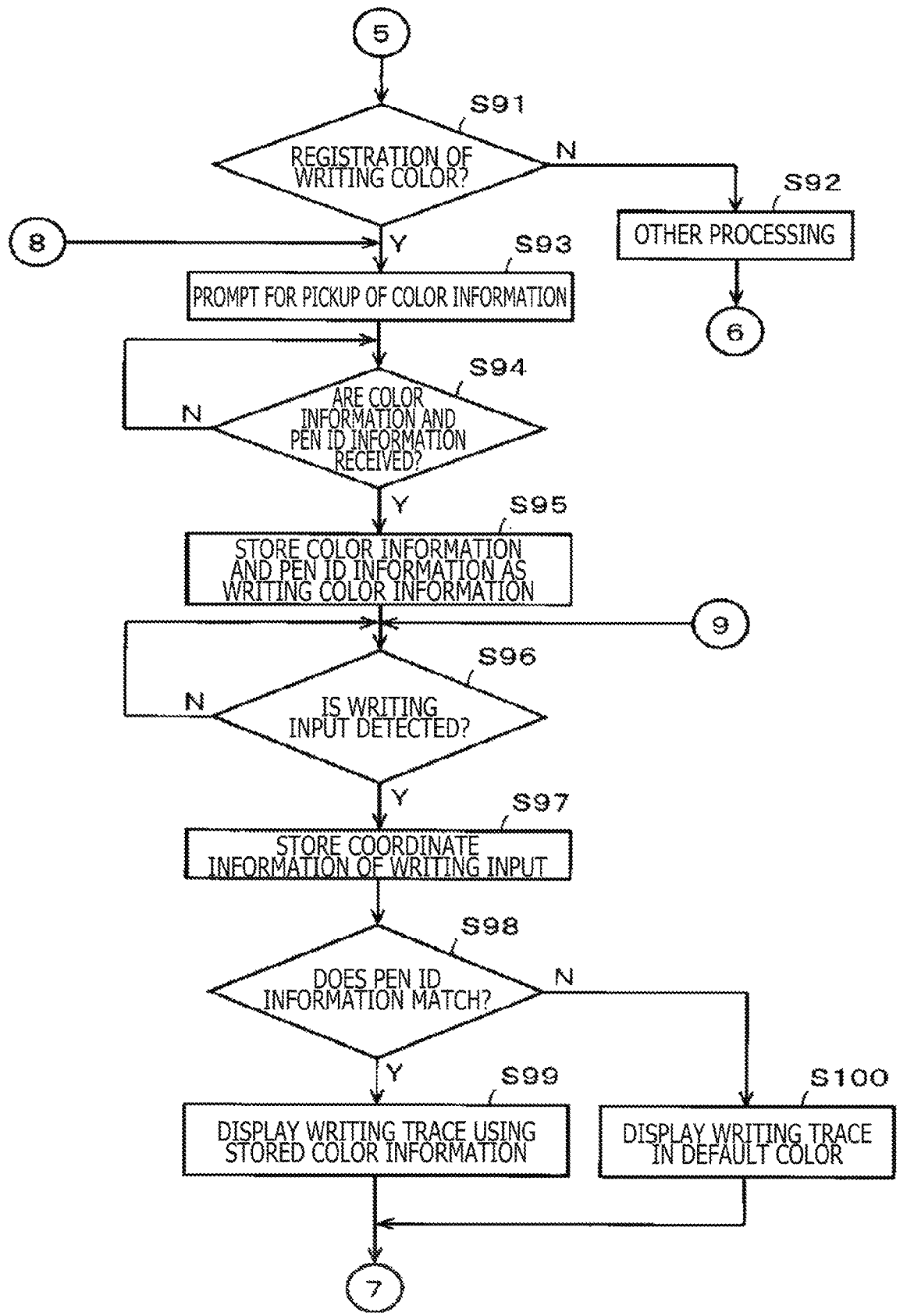
FIG. 16 is a part of the flowchart of assistance in explaining the example of operation of the electronic apparatus of the authentication system according to the second embodiment of the present disclosure.

Next, when determining at S77 in FIG. 14 that the processing event does not request "authentication," the information processing control circuit determines whether or not the processing event is "writing color registration" (S91 in FIG. 16). The processing at S91 to S93 in FIG. 16 is similar to the processing at S31 to S33 in FIG. 10 in the first embodiment, and therefore description thereof will be omitted here.

In the second embodiment, when the user performs an action of picking up color information by pressing the rear end portion of the pickup unit 11A of the electronic pen 1A against the planar portion FL in response to the prompt for pickup of color information at S93, the picked-up color information and the pen ID information are wirelessly transmitted from the pickup unit 11A, as described above.

Accordingly, in the second embodiment, the information processing control circuit of the electronic apparatus monitors for reception of the color information and the pen ID information from the pickup unit 11A of the electronic pen 1A after S93 (S94). When determining that the color information and the pen ID information are received, the information processing control circuit stores the received color information and the received pen ID information as writing color information in the writing color information storage device (S95).

Also, in the second embodiment, the electronic apparatus is configured to be able to receive writing input from the electronic pen 1A through the position detecting sensor 210 after storing the writing color information in the writing color information storage device at S95. However, in the second embodiment, as described above, a signal from the core body 105 of the electronic pen main body unit 10A of the electronic pen 1A includes the pen ID information in addition to position detection signal and pen pressure detection information.

Following S95, the information processing control circuit determines whether or not writing input by the electronic pen 1A is detected based on whether or not a signal at a predetermined level or higher is received from the electronic pen 1A through the position detecting sensor 210 (S96). The information processing control circuit thus monitors for writing input. Then, when determining at S96 that writing input is detected, the information processing control circuit stores coordinate information of a trajectory of the detected writing input (S97).

Next, the information processing control circuit checks the pen ID information included in the signal received as the writing input against the pen ID information stored in the writing color information storage device, and thereby determines whether or not the two pieces of pen ID information exactly match each other (S98).

When determining at S98 that the pen ID information included in the signal received as the writing input and the pen ID information stored in the writing color information storage device exactly match each other, the information processing control circuit makes color display of the trajectory of the writing input on the display screen of the display device 203 by using the color information stored in the writing color information storage device (S99).

When determining at S98 that the pen ID information included in the signal received as the writing input and the pen ID information stored in the writing color information storage device do not match each other, the information processing control circuit displays the trajectory of the writing input in a default color on the display screen of the display device 203 (S100).

Figure 17:
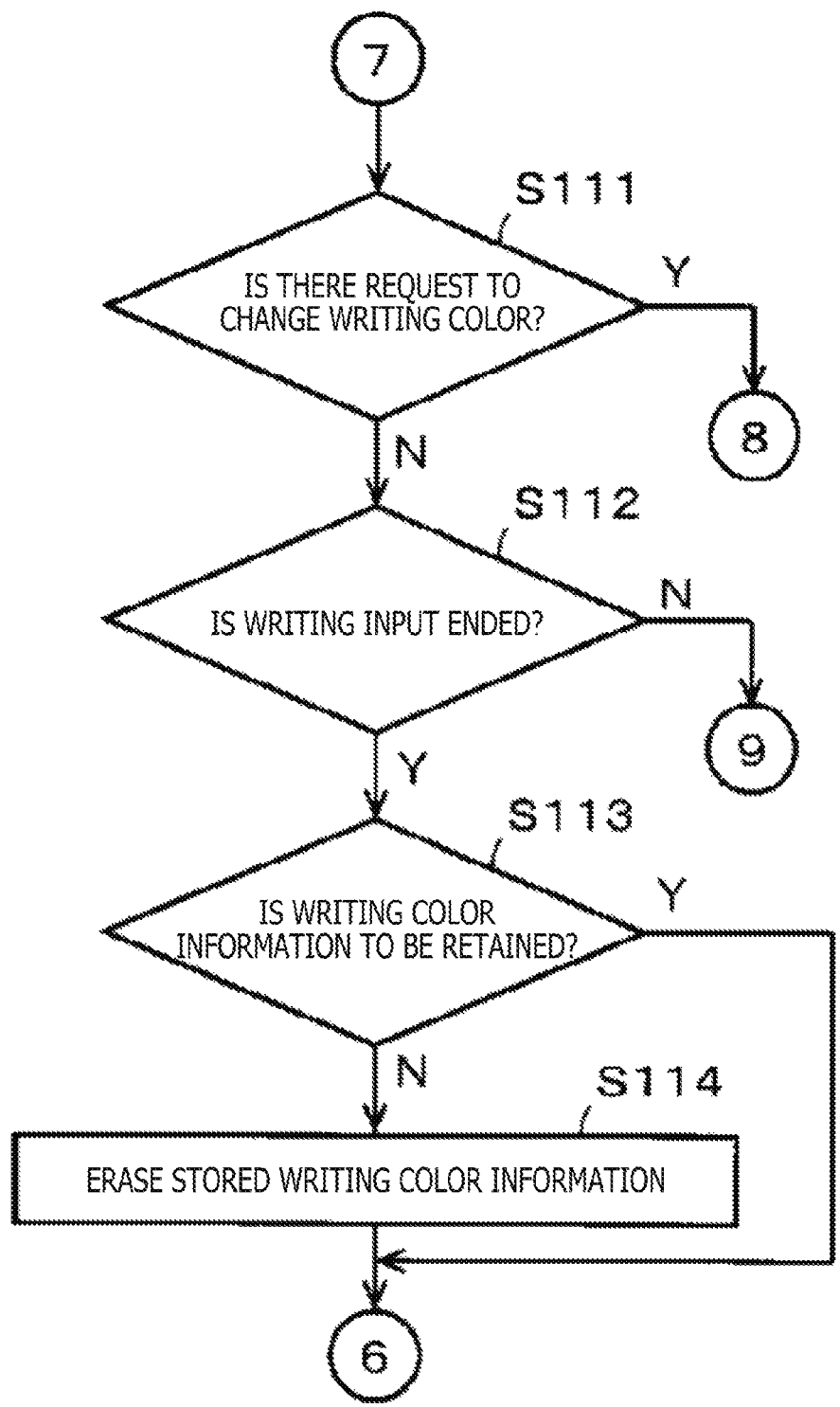
FIG. 17 is a part of the flowchart of assistance in explaining the example of operation of the electronic apparatus of the authentication system according to the second embodiment of the present disclosure.

Then, following S99 and S100, the information processing control circuit determines whether or not a request to change the writing color is made by the user (S111 in FIG. 17). When determining that the request to change the writing color is made, the information processing control circuit returns the processing to S93 to repeat the processing from S93 on down.

When determining at S111 that the request to change the writing color is not made by the user, the information processing control circuit determines whether or not the writing input is ended (S112). When determining that the writing input is not ended, the information processing control circuit returns the processing to S96 to repeat the processing from S96 on down.

When determining at S112 that the writing input is ended, the information processing control circuit makes an inquiry as to whether to retain the writing color information through the display screen of the display device 203 or through a voice message, and determines a response to the inquiry from the user (S113). When a response indicating that the writing color information is to be retained is obtained, the information processing control circuit returns the processing to S71 to repeat the processing from S71 on down.

When a response indicating that the writing color information is not to be retained is obtained at S113, the information processing control circuit erases the color information and the pen ID information as the writing color information stored in the writing color information storage device (S114). Then, the information processing control circuit returns the processing to S71 to repeat the processing from S71 on down.

As described above, the second embodiment uses the pen ID information for authentication in addition to the color information, and can therefore increase the strength of security as compared with a case where only the color information of the first embodiment is used for authentication.

In addition, in display control of the writing color in the second embodiment, the color information picked up by the pickup unit 11A of the electronic pen 1A is used as in the first embodiment, and the pen ID information and the color information are associated with each other and set as the writing color information. The writing trace can therefore be displayed using the registered color information only for writing input by the electronic pen 1A having the same pen ID. Thus, convenience is provided. Incidentally, the color information stored in the writing color information storage device may be stored in association with the coordinate information of the writing input which coordinate information is stored in the electronic apparatus.

Third Embodiment

A third embodiment is a modification of the second embodiment. In the foregoing second embodiment, the transmission of the color information and the pen ID information to the electronic apparatus is performed from the wireless communication device 118 included in the pickup unit 11A.

Figure 18:
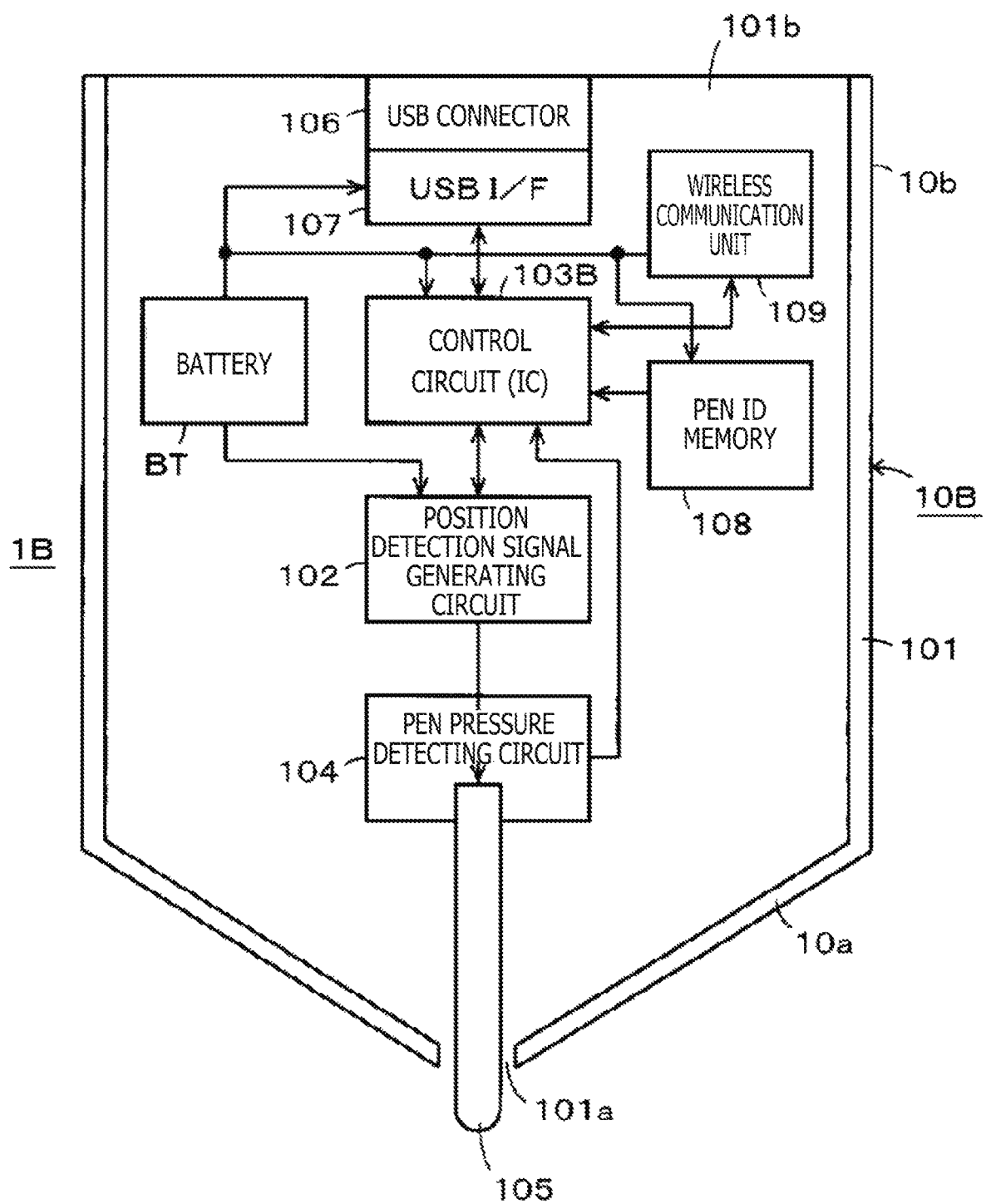
FIG. 18 is a block diagram illustrating an example of a configuration of an electronic pen main body unit of an electronic pen of an authentication system according to a third embodiment of the present disclosure.

On the other hand, in an electronic pen 1B according to the third embodiment, a pickup unit 11B is not provided with the wireless communication device 118, but an electronic pen main body unit 10B is provided with a wireless communication device 109 that performs wireless communication with the electronic apparatus, as illustrated in FIG. 18.

A control circuit 103B of the electronic pen main body unit 10B is configured to obtain color information from the pickup unit 11B through the USB interface 107, and transmit the color information to the electronic apparatus through the wireless communication device 109 together with the pen ID information stored in the pen ID memory 108. That is, the third embodiment is different from the second embodiment only in that the third embodiment wirelessly transmits the color information and the pen ID information to the electronic apparatus from the electronic pen main body unit 10B.

As illustrated in FIG. 18, the electronic pen main body unit 10B of the electronic pen 1B in the third embodiment includes the wireless communication device 109, and includes the control circuit 103B slightly different from that of the second embodiment in terms of control functions. Other configurations of the electronic pen main body unit 10B are similar to those of the electronic pen main body unit 10A in the second embodiment illustrated in FIG. 11, and the same parts are identified by the same reference symbols.

Incidentally, a hardware configuration of the pickup unit 11B is equal to a hardware configuration obtained by removing the wireless communication device in the pickup unit 11 illustrated in FIGS. 3A and 3B, and is therefore not illustrated here.

In addition, processing operation in the electronic apparatus can be made exactly similar to that of the second embodiment. That is, in the third embodiment, the electronic apparatus according to the second embodiment can be used as it is, and therefore description thereof, including description of the operation thereof, is omitted here.

Figure 19:
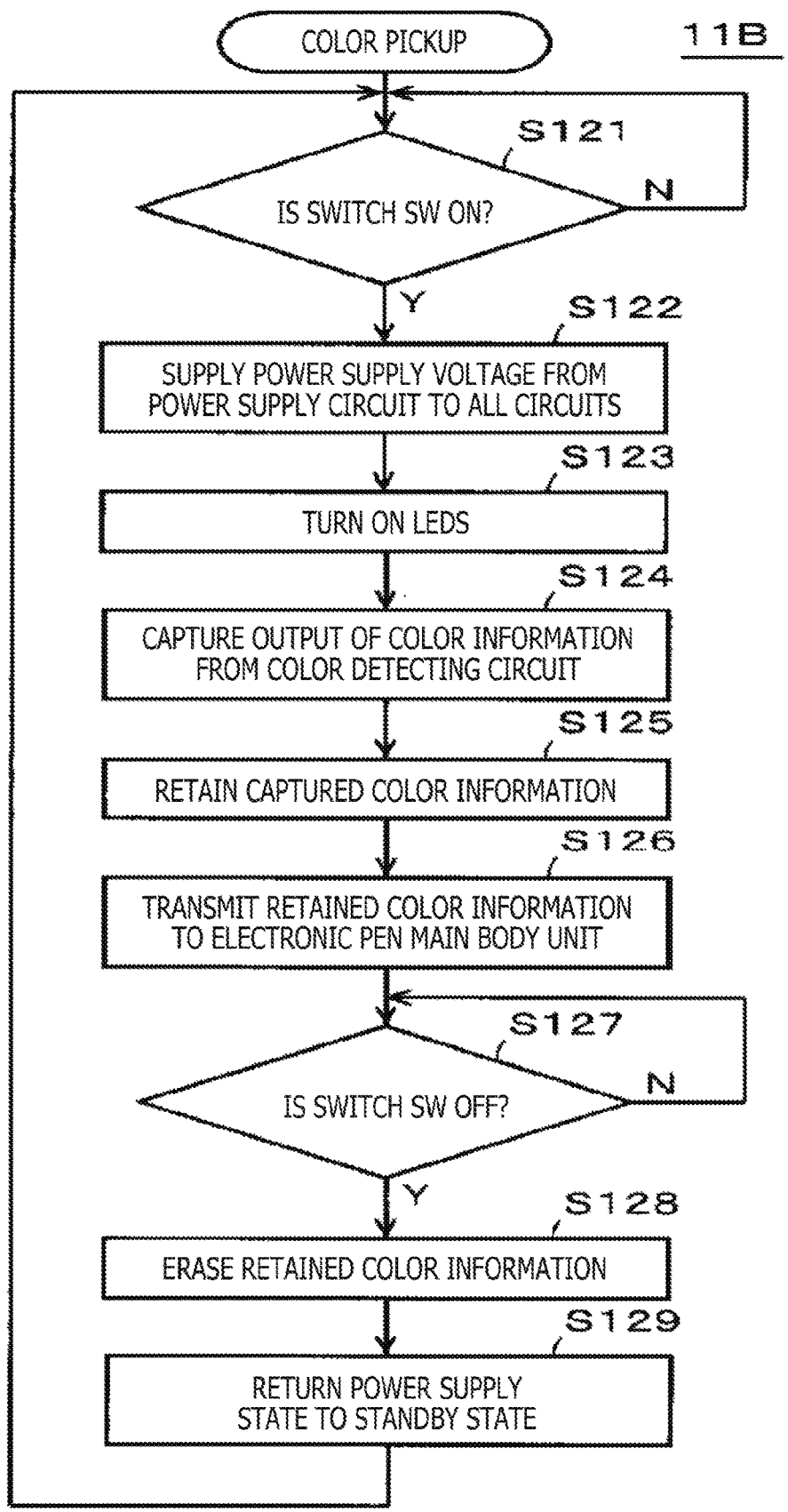
FIG. 19 is a flowchart of assistance in explaining an example of operation of a pickup unit of the electronic pen of the authentication system according to the third embodiment of the present disclosure.
Figure 20:
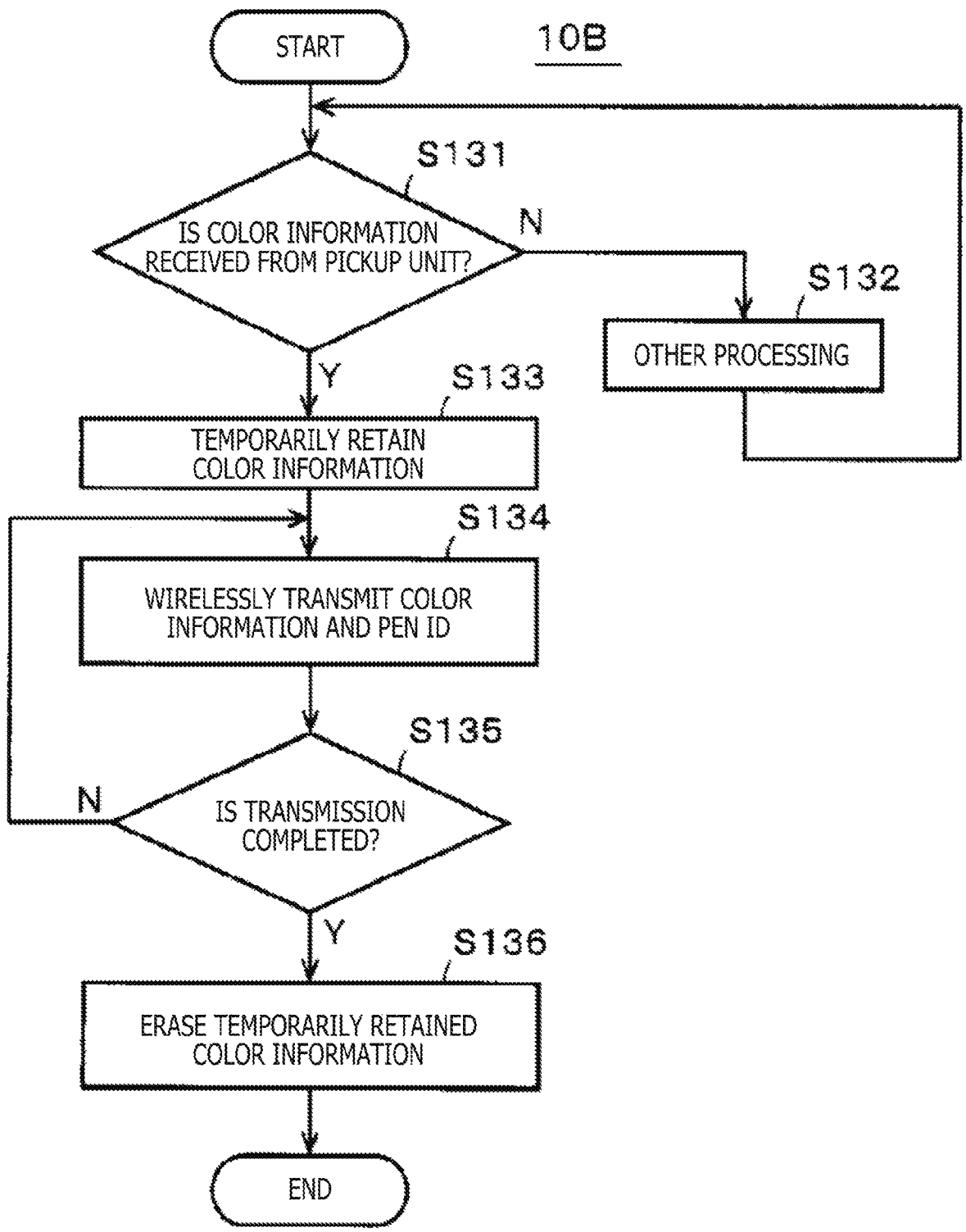
FIG. 20 is a flowchart of assistance in explaining an example of operation of the electronic pen main body unit of the electronic pen of the authentication system according to the third embodiment of the present disclosure.

FIG. 19 is a flowchart illustrating an example of a flow at a time of pickup operation in the pickup unit 11B of the electronic pen 1B in the present third embodiment. In addition, FIG. 20 is a flowchart illustrating an example of a flow of operation for transmission of color information by the electronic pen main body unit 10B of the electronic pen 1B in the present third embodiment.

In FIG. 19, processing from S121 to S125 is exactly similar to processing from S1 to S5 in FIG. 6 and from S51 to S55 in FIG. 12.

In the present third embodiment, following S125, a control circuit (not illustrated) of the pickup unit 11B transmits the color information picked up and retained at S125 to the electronic pen main body unit 10B through the USB interface 115 (S126). In this case, the control circuit of the pickup unit 11B may include information requesting wireless transmission of the color information to the electronic apparatus in the information transmitted through the USB interface 115 as the color information.

Following S126, the control circuit of the pickup unit 11B monitors for a change of the pressing detection switch 124 from the on state to the off state (S127). When determining that the pressing detection switch 124 is changed from the on state to the off state, the control circuit erases the color information stored and retained in the memory 119 (S128), and returns the state of supply of the power supply voltage from the power supply circuit 117 to each circuit to a standby state (S129). Then, following S129, the control circuit returns the processing to S121 to repeat the processing from S121 on down.

The control circuit 103B of the electronic pen main body unit 10B monitors for reception of the color information from the pickup unit 11B through the USB interface 107 (S131 in FIG. 20). When determining that the color information is not received, the control circuit 103B performs other processing (S132), and thereafter returns the processing to S131.

When determining at S131 that the color information from the pickup unit 11B is received, the control circuit 103B temporarily retains the received color information (S133). Then, the control circuit 103B reads the pen ID information stored in the pen ID memory 108, and wirelessly transmits the read pen ID information and the color information obtained from the pickup unit 11B to the electronic apparatus through the wireless communication device 109 (S134).

Then, the control circuit 103B determines whether or not the transmission is completed (S135). When determining that the transmission is not completed, the control circuit 103B returns to S134 to continue transmission processing. When determining that the transmission is completed, the control circuit 103B erases the temporarily retained color information obtained from the pickup unit 11B (S136), and then ends the processing routine.

Incidentally, in the example of FIG. 20, the wireless transmission of the color information and the pen ID information has been described as being performed triggered by the reception of the color information from the pickup unit 11B. However, in a case where information requesting the wireless transmission to the electronic apparatus is added to the color information from the pickup unit 11B, as described earlier, the wireless transmission to the electronic apparatus is performed triggered by detection of the added information requesting the wireless transmission.

The third embodiment also provides effects similar to those of the second embodiment, and has an effect of reducing a processing load on the control circuit of the pickup unit 11B.

Incidentally, in the foregoing second embodiment and the foregoing third embodiment, the pickup units 11A and 11B are supplied with power supply voltage from the batteries BT of the electronic pen main body units 10A and 10B. However, needless to say, each of the pickup units 11A and 11B may include a battery.

[Modifications of Second Embodiment and Third Embodiment]

In the foregoing second embodiment and the foregoing third embodiment, the color information picked up by the pickup unit and the pen ID information are transmitted as a pair to the electronic apparatus through the wireless communication device 118 of the pickup unit 11A or the wireless communication device 109 of the electronic pen main body unit 10B. However, the color information and the pen ID information may be transmitted by different routes by transmitting the color information to the electronic apparatus through the wireless communication device 118 of the pickup unit 11A or the wireless communication device 109 of the electronic pen main body unit 10B, and including the pen ID information in the signal from the core body 105 of the electronic pen main body unit 10A or 10B and transmitting the pen ID information to the electronic apparatus through the sensor unit.

In addition, while the pair information of the color information and the pen ID information is wirelessly transmitted through the wireless communication device 118 or the wireless communication device 109 in the second embodiment and the third embodiment, the pair information of the color information and the pen ID information may be included in the signal from the core body 105 of the electronic pen main body unit 10, and transmitted to the electronic apparatus through the position detecting sensor 210. In that case, the wireless communication device 118 or the wireless communication device 109 and the wireless communication device 204 do not need to be provided.

As a modification of the second embodiment and the third embodiment, in a case where the authentication target is a document file or an image drawing file constituted of writing input by the electronic pen or folders thereof, advance registration of the authentication target can be omitted by using the pen ID information. That is, the pen ID information of the electronic pen is stored in association with (in a state of being added to) the document file or the image drawing file constituted of the writing input by the electronic pen. Then, in the case of a document file or a folder having the same pen ID information stored as authentication reference information, the document file or the folder can be recognized as the authentication target, and authentication based on the color information can be performed. In this case, however, different color information cannot be set for each of the document file, the image drawing file, and the folders thereof, but authentication based on one common piece of color information is performed for one piece of pen ID information.

Fourth Embodiment

In a fourth embodiment, consideration is given such that security can be made stricter than in the second embodiment and the third embodiment, and a signature input to the electronic apparatus by the user by using the electronic pen is added as authentication reference information.

As the electronic pen constituting the present fourth embodiment, each of the electronic pen 1A according to the foregoing second embodiment or the electronic pen 1B according to the foregoing third embodiment can be used, and either of the electronic pen 1A according to the foregoing second embodiment or the electronic pen 1B according to the foregoing third embodiment may be used. Hence, color information pickup operation and wireless sending-out operation, in which pen ID information is also included, in the electronic pen 1A (or the electronic pen 1B) constituting the present fourth embodiment are similar to those of the electronic pen 1A according to the foregoing second embodiment or the electronic pen 1B according to the foregoing third embodiment. Accordingly, description thereof will be omitted here.

In addition, a hardware configuration of an electronic apparatus 2C constituting the present fourth embodiment is similar to the hardware configuration of the electronic apparatus according to the foregoing second embodiment and the foregoing third embodiment. However, an information processing control circuit (not illustrated) included in the electronic apparatus 2C according to the fourth embodiment is different from the information processing control circuit of the electronic apparatus according to the second embodiment and the third embodiment in terms of control contents, and an authentication reference information storage device is different from the authentication reference information storage device of the electronic apparatus according to the second embodiment and the third embodiment in terms of authentication reference information stored in the authentication reference information storage device.

An example of operation of the information processing control circuit of the electronic apparatus 2C according to the present fourth embodiment will hereinafter be described with reference to flowcharts of FIGS. 21 to 23.

Figure 21:
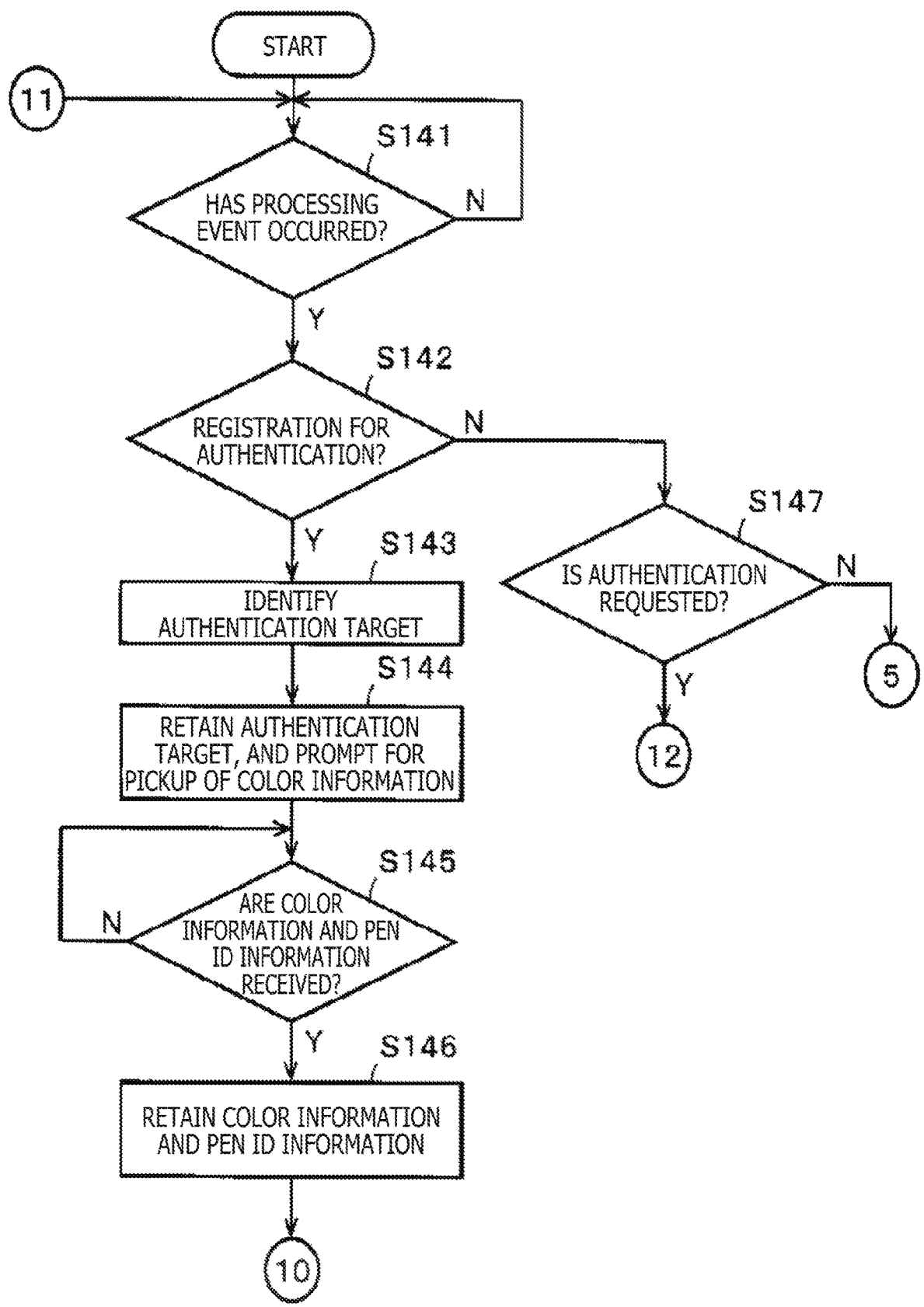
FIG. 21 is a part of a flowchart of assistance in explaining an example of operation of an electronic apparatus of an authentication system according to a fourth embodiment of the present disclosure.

The processing at S141 to S145 in FIG. 21 is similar to the processing at S71 to S75 described with reference to FIG. 14 in the second embodiment, and therefore description thereof will be omitted here.

In the fourth embodiment, when the information processing control circuit determines at S145 that the color information and the pen ID information are received, the information processing control circuit temporarily retains the received color information and the received pen ID (S146).

Figure 22:
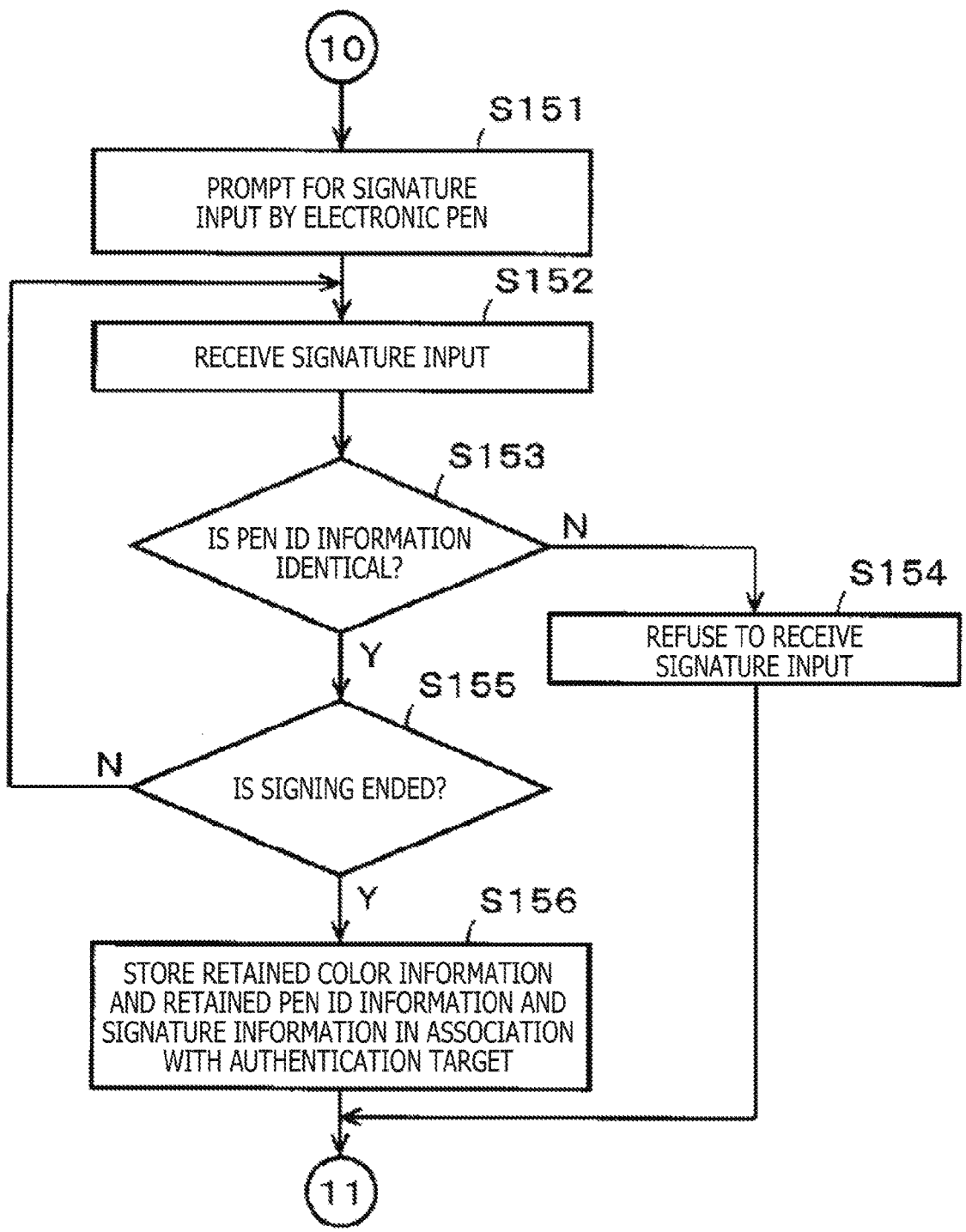
FIG. 22 is a part of the flowchart of assistance in explaining the example of operation of the electronic apparatus of the authentication system according to the fourth embodiment of the present disclosure.
Figure 25:
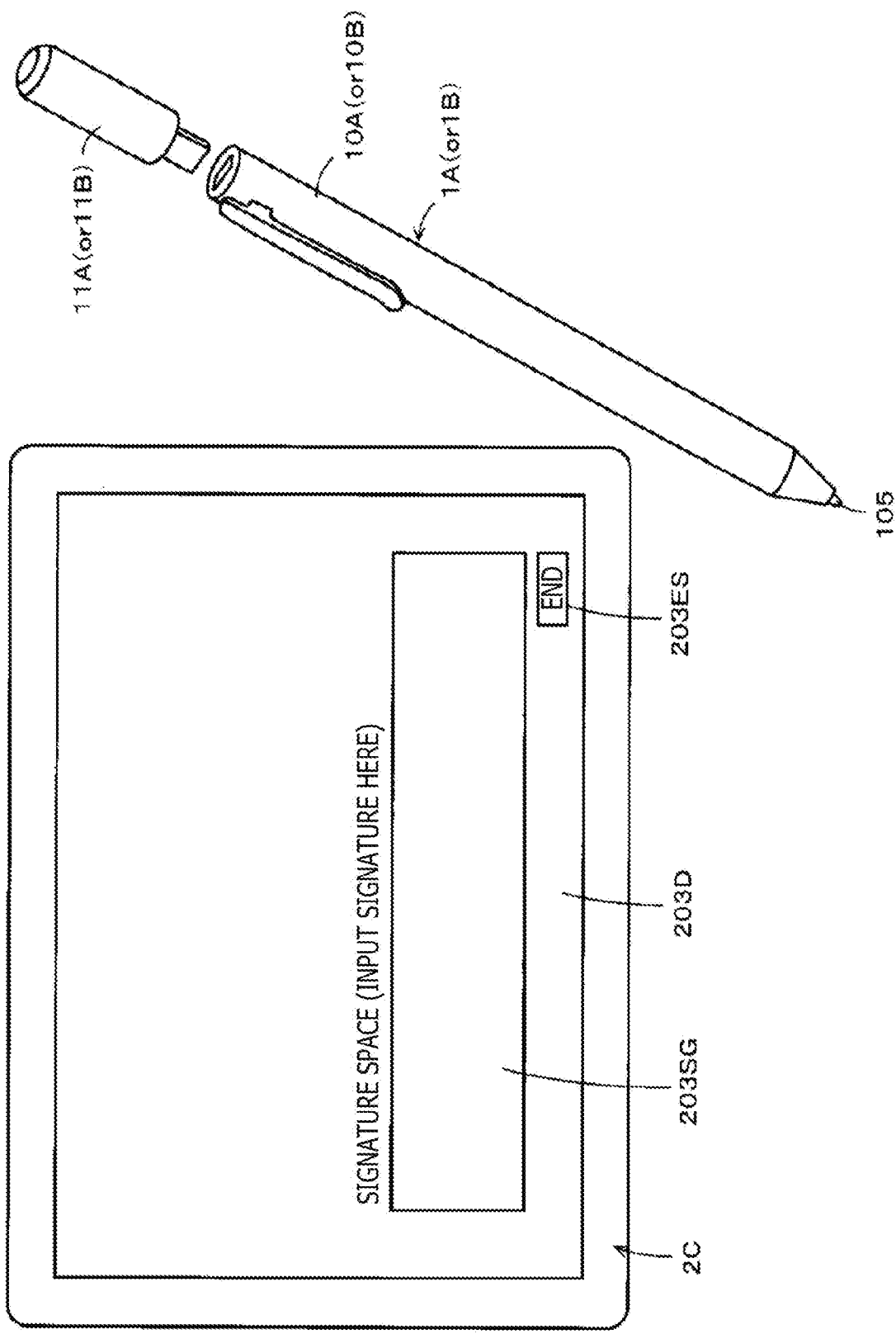
FIG. 25 is a diagram used to describe an example of operation of the electronic apparatus of the authentication system according to the fourth embodiment of the present disclosure.

Next, the information processing control circuit displays a signature input space (signature space) 203SG as illustrated in FIG. 25 on a display screen 203D of the display device 203, and prompts for signature input to the input space 203SG by the electronic pen 1A (or the electronic pen 1B) (S151 in FIG. 22).

Responding to this prompt, the user performs signature input in the input space 203 SG by the electronic pen 1A (or the electronic pen 1B). In this case, as described above, the pen ID information is sent out from the core body 105 of the electronic pen 1A (or the electronic pen 1B) as a time division signal, for example, in addition to the position detection signal and the pen pressure information.

In the electronic apparatus 2C, the position detection control circuit 227 of the position detection processing circuit 21 (see FIG. 5) detects the signal sent out from the core body 105 of the electronic pen 1A (or the electronic pen 1B) through the position detecting sensor 210. The electronic apparatus 2C thereby detects coordinates (signature writing trace information) of a trajectory indicated by the core body 105 of the electronic pen 1A (or the electronic pen 1B), calculates a pen pressure value from the pen pressure information, and further detects the pen ID information. The position detection control circuit 227 then supplies the detected signature writing trace information, information on the pen pressure value, and the pen ID information to the information processing circuit.

The information processing control circuit receives the signature input including the signature writing trace information, the information on the pen pressure value, and the pen ID information from the position detection control circuit 227 (S152). The information processing control circuit checks the pen ID information included in the signature input against the pen ID information retained at S146, and determines whether or not the two pieces of pen ID information are identical to each other (S153).

When determining at S153 that the pen ID information included in the signature input and the pen ID information retained at S146 are not identical to each other, the information processing control circuit refuses to receive the signature input (S154). The information processing control circuit then returns the processing to S141 in FIG. 21 to repeat the processing from S141 on down.

The processing of S153 and S154 is to ensure that the electronic pen with which the operation of picking up the color information is performed and the electronic pen with which the signature input is performed are identical to each other because the electronic pen with which the operation of picking up the color information is performed and the electronic pen with which the signature input is performed should be identical to each other. The processing of S153 and S154 is thus considered to be able to enhance security.

However, it is considered that the electronic pen with which the operation of picking up the color information is performed and the electronic pen with which the signature input is performed are rarely different from each other, and therefore the processing of S153 and S154 may be omitted.

When determining at S153 that the pen ID information included in the signature input and the pen ID information retained at S146 are identical to each other, the information processing control circuit determines whether or not the signature input is ended by determining whether or not an end button icon 203ES of the display screen 203D in FIG. 25, for example, is clicked (S155).

When determining at S155 that the signature input is not ended, the information processing control circuit returns the processing to S152 to repeat the processing from S152 on down. When determining at S155 that the signature input is ended, the information processing control circuit stores authentication reference information obtained by associating the color information and the pen ID information retained at S146 and signature information (writing trace coordinate information) with the authentication target as table information as illustrated in FIG. 26 in the authentication reference information storage device (S156).

Following S156, the information processing control circuit returns the processing to S141 in FIG. 21 to repeat the processing from S141 on down.

Figure 23:
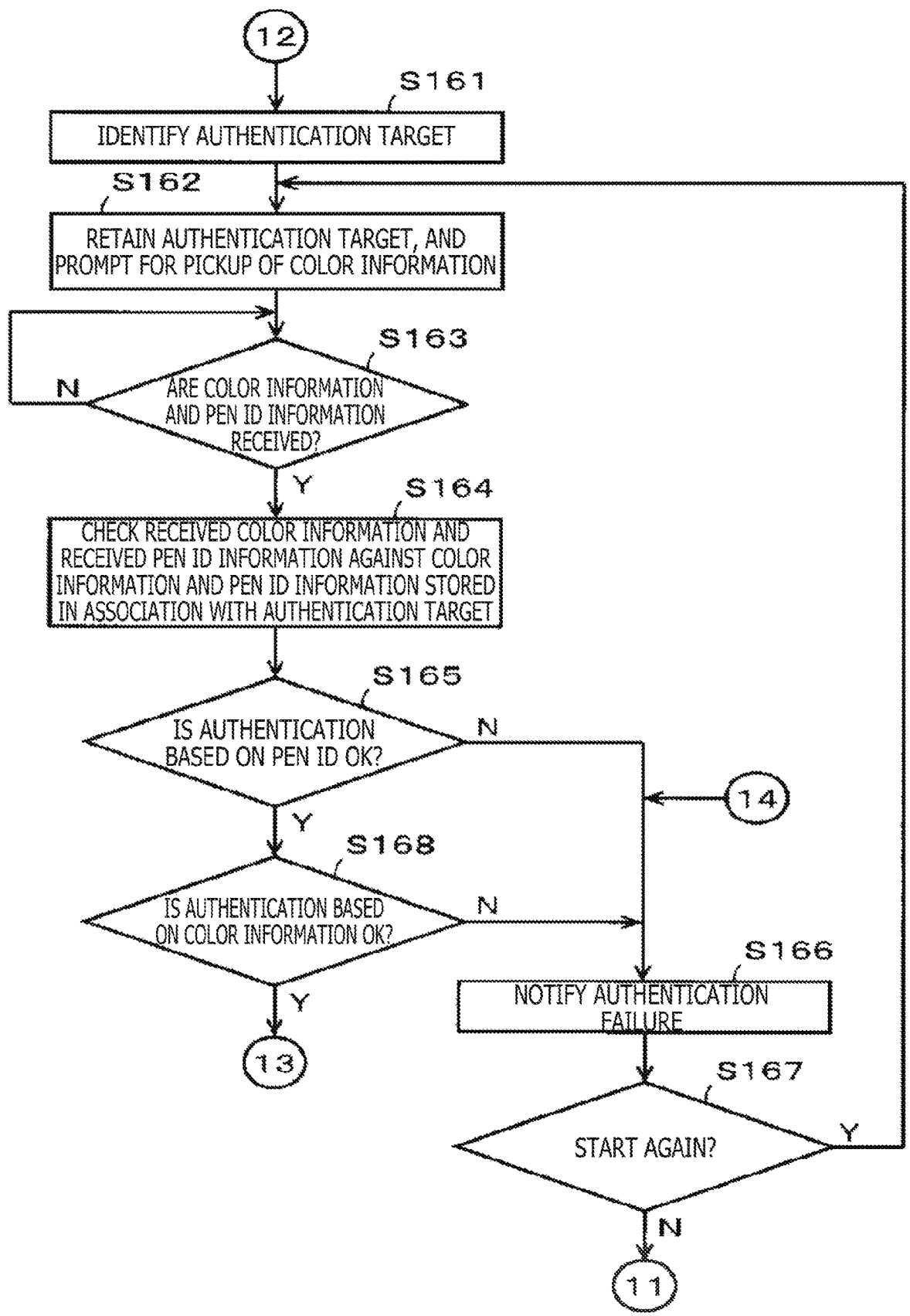
FIG. 23 is a part of the flowchart of assistance in explaining the example of operation of the electronic apparatus of the authentication system according to the fourth embodiment of the present disclosure.
Figure 24:
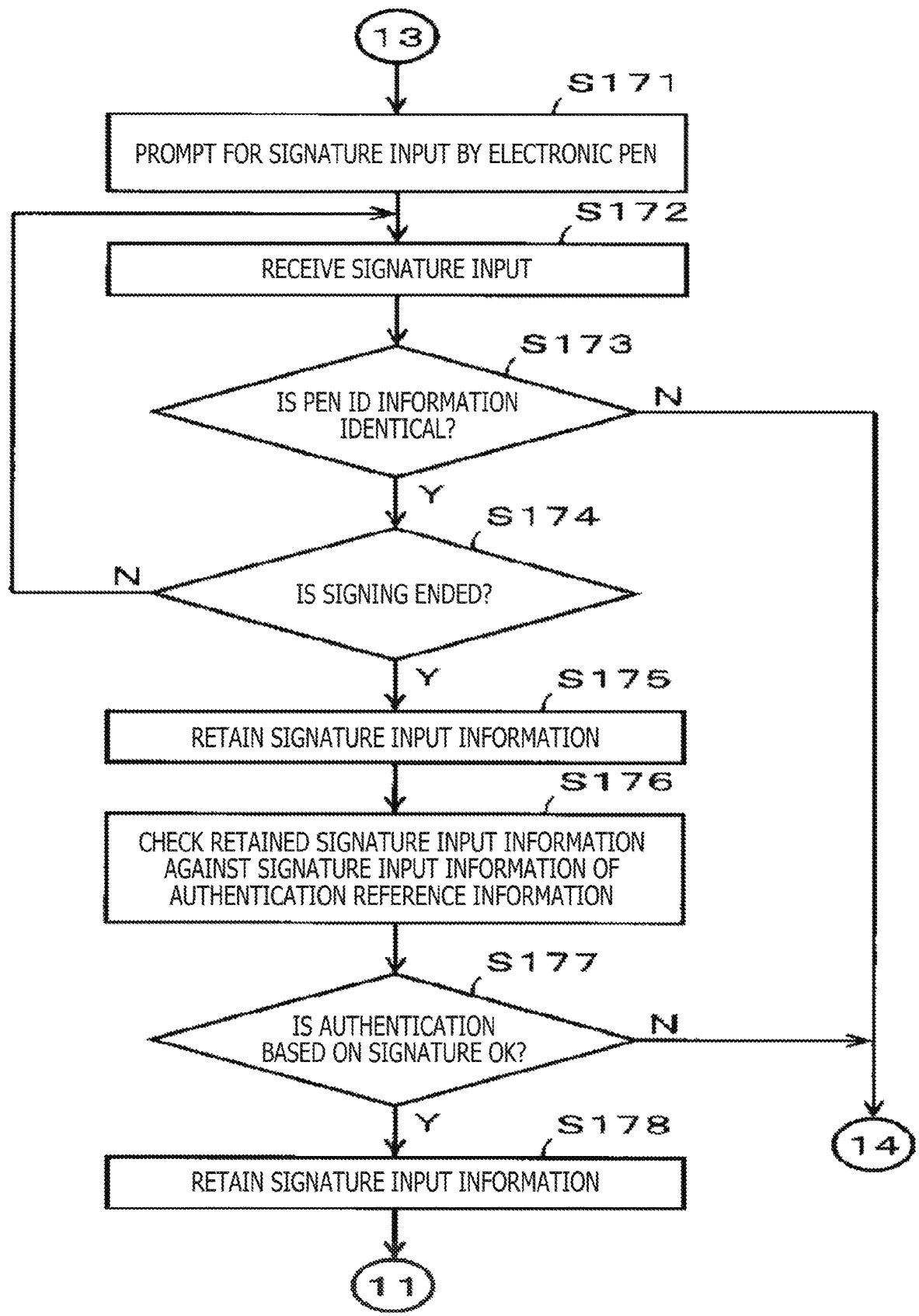
FIG. 24 is a part of the flowchart of assistance in explaining the example of operation of the electronic apparatus of the authentication system according to the fourth embodiment of the present disclosure.

When determining at S147 in FIG. 21 that the processing event determined to have occurred at S141 requests authentication, the information processing control circuit performs processing from S161 in FIG. 23. Processing from S161 to S168 in FIG. 23 IS similar to processing from S81 to S88 in FIG. 15, and therefore description thereof will be omitted.

Then, when determining at S168 in FIG. 23 that authentication based on the pen ID is OK and that authentication based on the color information is OK, the information processing control circuit displays the signature input space (signature space) 203 SG as illustrated in FIG. 25 on the display screen 203D of the display device 203, and prompts for signature input to the input space 203SG by the electronic pen 1A (or the electronic pen 1B) (S171 in FIG. 22).

Responding to this prompt, the user performs signature input in the input space 203 SG by the electronic pen 1A (or the electronic pen 1B). In this case, as described above, the pen ID information is sent out as a time division signal, for example, from the core body 105 of the electronic pen 1A (or the electronic pen 1B) in addition to the position detection signal and the pen pressure information.

In the electronic apparatus 2C, as described earlier, the position detection control circuit 227 (see FIG. 5) of the position detection processing circuit 21 detects coordinates (signature writing trace information) of a trajectory indicated by the core body 105 of the electronic pen 1A (or the electronic pen 1B), calculates a pen pressure value from the pen pressure information, and further detects the pen ID information. The position detection control circuit 227 then supplies the detected signature writing trace information, information on the pen pressure value, and the pen ID information to the information processing control circuit.

The information processing control circuit receives the signature input including the signature writing trace information, the information on the pen pressure value, and the pen ID information from the position detection control circuit 227 (S172). The information processing control circuit checks the pen ID information included in the signature input against the pen ID information retained at S162, and thereby determines whether or not the two pieces of pen ID information are identical to each other (S173).

When determining at S173 that the pen ID information included in the signature input received at S172 and the pen ID information retained at S162 are not identical to each other, the information processing control circuit shifts the processing to S166 in FIG. 23, and notifies authentication FAILURE. Thereafter, the information processing control circuit returns the processing to S141 in FIG. 21 to repeat the processing from S141 on down.

The processing of S173 and S174 is to ensure that the electronic pen with which the operation of picking up the color information is performed and the electronic pen with which the signature input is performed are identical to each other because the electronic pen with which the operation of picking up the color information is performed and the electronic pen with which the signature input is performed should be identical to each other. The processing of S173 and S174 is thus considered to be able to enhance security. However, it is considered that the electronic pen with which the operation of picking up the color information is performed and the electronic pen with which the signature input is performed are rarely different from each other, and therefore the processing of S173 and S174 may be omitted.

When determining at S173 that the pen ID information included in the signature input and the pen ID information retained at S162 are identical to each other, the information processing control circuit determines whether or not the signature input is ended by determining whether or not the end button icon 203ES of the display screen 203D in FIG. 25, for example, is clicked (S174).

When determining at S174 that the signature input is ended, the information processing control circuit retains signature input information (S175), and checks the retained signature input information against signature input information stored in the authentication reference information storage device (S176).

Then, the information processing control circuit determines whether or not the authentication based on the signature is OK based on whether or not the signatures match each other as a result of checking the signature input information (S177). Whether or not the signatures match each other is for example determined based on whether or not a difference between the two pieces of input information that are checked against each other is equal to or less than a predetermined threshold value. When the difference is equal to or less than the threshold value, it is determined that the authentication is OK. When the difference is larger than the threshold value, it is determined that the authentication is FAILURE. In this case, security is strict when the value of the threshold value is small, and security is weak when the value of the threshold value is large.

When determining at S177 that the authentication based on the signature is FAILURE, the information processing control circuit shifts the processing to S166 in FIG. 23, and notifies authentication FAILURE. Thereafter, the information processing control circuit returns the processing to S141 in FIG. 21 to repeat the processing from S141 on down.

When determining at S177 that the authentication based on the signature is OK, the information processing control circuit permits the authentication target (S178). The information processing control circuit thereafter returns the processing to S141 in FIG. 21 to repeat the processing from S141 on down.

The fourth embodiment described above performs the authentication based on the signature in addition to the authentication based on the color information and the authentication based on the pen ID. Security can therefore be made stricter.

Incidentally, in the description of the foregoing fourth embodiment, the authentication using the signature is added to the authentication system according to the second embodiment or the third embodiment. However, the authentication using the signature may be added to the authentication system according to the first embodiment. That is, security protection of the authentication target may be allowed to be removed only when both the authentication based on the color information and the authentication based on the signature are OK.

[Other Embodiments or Modifications]

In the foregoing embodiments, the electronic apparatuses generate table information storing authentication targets and authentication reference information in association with each other, and perform authentication management and authentication control processing based on the table information. However, for example, each of the authentication targets such as an application program, a file, a folder, or the like may have information added thereto which information indicates that the authentication target is under security management, and may have authentication reference information added thereto. In that case, at a time of starting the application program as an authentication target or at a time of opening a file or a folder as an authentication target, authentication processing similar to the foregoing is automatically started and performed to determine a success or failure of the authentication.

In addition, in the recognition systems according to the foregoing second to fourth embodiments, the color information and the pen ID information of the electronic pen 1A or 1B are combined with each other to make security stronger than when only the color information is used. However, the pickup unit 11A or 11B separate from the electronic pen main body unit 10A or 10B may be provided with identifying information of the pickup unit (unit ID of the pickup unit), a storage device that stores the identifying information of the pickup unit may be provided, and in place of the pen ID information, the identifying information of the pickup unit may be transmitted to the electronic apparatus 2 together with the color information. Also in this case, a circuit that transmits the color information and the identifying information from the electronic pen 1A or 1B to the electronic apparatus 2 may be the wireless communication device included in the pickup unit 11A or 11B, or may be the wireless communication device included in the electronic pen main body unit 10A or 10B. In addition, the color information and the identifying information may be included in the signal sent out from the core body 105 of the electronic pen main body unit 10A or 10B.

In a case where the unit ID of the pickup unit is thus used as the identifying information transmitted together with the color information, and the pickup unit 11A or 11B is provided with the wireless communication device and includes a battery, the transmission of the color information and the identifying information of the pickup unit 11A or 11B can be performed even when the pickup unit 11A or 11B is not electrically connected to the electronic pen main body unit 10A or 10B. Therefore, the pickup unit 11A or 11B and the electronic pen main body unit 10A or 10B do not need to be electrically connected to each other by USB connection as in the foregoing example or the like, and it suffices for the pickup unit 11A or 11B and the electronic pen main body unit 10A or 10B to be simply configured to be capable of being coupled to each other.

In the foregoing embodiments, the electronic pen has the electronic pen main body unit and the pickup unit as separate parts, and both are configured to be coupled to each other. However, it is needless to say that a configuration of an electronic pen as a single body may also be made in which the functions of the electronic pen main body unit and the functions of the pickup unit are provided within the casing of the electronic pen without the electronic pen main body unit and the pickup unit being formed as separate parts. In this case, the functional parts of the pickup unit including the lens exposed to the outside are arranged on the rear end side of the casing of the electronic pen which rear end side is opposite from the core body side of the casing of the electronic pen.

Incidentally, in the foregoing embodiments, the color information is picked up and used for authentication. Thus, the light receiver 122 is formed by phototransistors, and the color detecting circuit is provided. However, the authentication system according to the present disclosure can also be configured to pick up image information in place of the color information.

Specifically, in that case, the light receiver 122 is formed by an image sensor having a plurality of light receiving cells arranged two-dimensionally, and an image detecting circuit that detects an image from output of the image sensor is provided in place of the color detecting circuit, so that the pickup unit can pick up an image of a part that the rear end portion is pressed against. In this case, it is needless to say that the image is not limited to a monochrome image, but that a color image can be picked up as the image.

In addition, all of the electronic pen main body units of the electronic pens according to the foregoing embodiments have a configuration of an active capacitance type electronic pen that sends out a signal from a core body. However, the electronic pen interacting with the position detecting sensor 210 may be of any type. That is, the electronic pen may be a passive type electronic pen, or may be an electromagnetic induction type electronic pen. The electromagnetic induction type electronic pen may be of a type that receives a signal from the position detecting sensor 210 and feeds back the signal, or may be of a type that itself includes a signal generating circuit.

It is to be noted that the embodiment of the present disclosure is not limited to the foregoing embodiments, and that various changes can be made without departing from the spirit of the present disclosure.

What is claimed is:

1. An authentication system comprising:
   an electronic pen; and
   an electronic apparatus which, in operations, receives a signal from the electronic pen and performs authentication;
   the electronic pen including:
      a pickup unit on a first side of a tubular casing, the first side being opposite in an axial direction of the electronic pen from a second side of the tubular casing that includes a tip for performing position indication input by interacting with a position detecting sensor, the pickup unit picking up color information or image information of a part when a first portion of the electronic pen is pressed against the part, and
      a transmitter which, in operation, transmits the color information or the image information picked up by the pickup unit to the electronic apparatus;
   the electronic apparatus including:
      a receiver which, in operation, receives the color information or the image information transmitted from the electronic pen, an authentication reference information storage device which, in operation, stores color authentication reference information or image authentication reference information, an authentication success or failure determining circuit which, in operation, determines a success or a failure of authentication by comparing the color information or the image information received by the receiver with the color authentication reference information or the image authentication reference information stored in the authentication reference information storage device, and a control circuit which, in operation, removes security protection of an authentication target associated with the color authentication reference information or the image authentication reference information when the authentication success or failure determining circuit determines that the authentication succeeds.

2. The authentication system according to claim 1, wherein:

the electronic pen includes an identifying information storage device which, in operation, stores unique identifying information, and the transmitter transmits the identifying information of the identifying information storage device to the electronic apparatus together with the color information or the image information picked up by the pickup unit, and the receiver of the electronic apparatus receives the identifying information together with the color information or the image information transmitted from the electronic pen, the authentication reference information storage device stores authentication reference information of the identifying information in addition to the color authentication reference information or the image authentication reference information, and the authentication success or failure determining circuit determines the success or the failure of the authentication by comparing the color information or the image information transmitted from the electronic pen and the identifying information with the color authentication reference information or the image authentication reference information and the authentication reference information of the identifying information, the color authentication reference information or the image authentication reference information and the authentication reference information of the identifying information being stored in the authentication reference information storage device.

3. The authentication system according to claim 1, wherein:

the electronic apparatus includes the position detecting sensor, and includes a detecting circuit which, in operation, detects trajectory information corresponding to the position indication input by the electronic pen through the position detecting sensor, the authentication reference information storage device stores authentication reference information of the trajectory information, and the authentication success or failure determining circuit determines the success or the failure of the authentication by comparing the color information or the image information transmitted from the electronic pen with the color authentication reference information or the image authentication reference information stored in the authentication reference information storage device, and comparing the trajectory information detected by the detecting circuit with the authentication reference information of the trajectory information, the authentication reference information of the trajectory information being stored in the authentication reference information storage device.

4. The authentication system according to claim 1, wherein:

the authentication reference information storage device of the electronic apparatus stores the authentication reference information in association with the authentication target.

5. The authentication system according to claim 1, wherein:

the transmitter and the receiver perform wireless communication of a predetermined communication standard.

6. The authentication system according to claim 1, wherein:

the pickup unit has a separate body that is removable from a main body portion of the electronic pen, a first connector disposed in the main body portion of the electronic pen, the pickup unit includes a second connector that connects to the first connector, the pickup unit and the main body portion of the electronic pen are electrically connected to each other, and the transmitter transmits and receives information by interaction with the position detecting sensor.

7. The authentication system according to claim 1, wherein:

the electronic pen includes an identifying information storage device which, in operation, stores unique identifying information, and includes an identifying information transmitter which, in operation, transmits the identifying information of the identifying information storage device to the electronic apparatus, and the electronic apparatus includes an identifying information receiver which, in operation, receives the identifying information transmitted from the electronic pen, the authentication reference information storage device stores authentication reference information of the identifying information in addition to the color authentication reference information or the image authentication reference information, and the authentication success or failure determining circuit determines the success or the failure of the authentication by comparing the color information or the image information transmitted from the electronic pen and the identifying information with the color authentication reference information or the image authentication reference information and the authentication reference information of the identifying information, the color authentication reference information or the image authentication reference information and the authentication reference information of the identifying information being stored in the authentication reference information storage device.

8. The authentication system according to claim 7, wherein:

the electronic apparatus includes the position detecting sensor, and the identifying information transmitter and the identifying information receiver transmit and receive the identifying information by interaction between the electronic pen and the position detecting sensor.

9. The authentication system according to claim 1, wherein:

the pickup unit has a separate body that is removable from a main body portion of the electronic pen.

10. The authentication system according to claim 9, wherein:
- a first connector is disposed in the main body portion of the electronic pen,
- the pickup unit includes a second connector that connects to first connector, and
- the pickup unit and the main body portion of the electronic pen are electrically connected to each other.

11. The authentication system according to claim 9, wherein:
- the transmitter is disposed in the pickup unit.

12. The authentication system according to claim 1, wherein:
- the pickup unit has an opening portion in the first portion, and a light emitting device and a light receiving device are arranged within the opening portion, and
- when entry of external light into the opening portion is blocked while the opening portion is pressed against a planar portion, the light emitting device starts light emission, the planar portion is irradiated with light from the light emitting device, the light receiving device receives reflected light from the planar portion, and the color information or the image information is obtained from an output signal of the light receiving device.

13. The authentication system according to claim 12, wherein:
- the pickup unit includes a detecting circuit which, in operation, detects when the opening portion is pressed against the planar portion, and
- the pickup unit performs control of lighting the light emitting device based on a detection output of the detecting circuit.

14. The authentication system according to claim 12, wherein:
- a lens is disposed in the opening portion.

15. The authentication system according to claim 14, wherein:
- the lens protrudes outwardly from the opening portion and is disposed so as to be displaceable to an inner side of the opening portion in the axial direction of the electronic pen when the lens is depressed from an outside of the electronic pen,
- the pickup unit includes a switch which, in operation, changes a switch state according to displacement of the lens to the inner side of the opening portion, and
- the pickup unit performs control of lighting the light emitting device according to a change in the switch state of the switch.

* * * * *